US011799736B2

(12) United States Patent
Hoopes et al.

(10) Patent No.: US 11,799,736 B2
(45) Date of Patent: Oct. 24, 2023

(54) SYSTEMS AND METHODS FOR INVESTIGATING POTENTIAL INCIDENTS ACROSS ENTITIES IN NETWORKED ENVIRONMENTS

(71) Applicant: Digital Guardian LLC, Waltham, MA (US)

(72) Inventors: Jaimen Dee Hoopes, Lehi, UT (US); Christian J Weibell, Lindon, UT (US); Christopher James Balmforth, Eagle Mountain, UT (US)

(73) Assignee: DIGITAL GUARDIAN LLC, Waltham, MA (US)

( * ) Notice: Subject to any disclaimer, the term of this patent is extended or adjusted under 35 U.S.C. 154(b) by 0 days.

(21) Appl. No.: 16/729,115

(22) Filed: Dec. 27, 2019

(65) Prior Publication Data
US 2021/0203567 A1 Jul. 1, 2021

(51) Int. Cl.
*G06F 3/0482* (2013.01)
*H04L 41/22* (2022.01)
(Continued)

(52) U.S. Cl.
CPC ............ *H04L 41/22* (2013.01); *G06F 3/0482* (2013.01); *H04L 41/14* (2013.01); *H04L 43/045* (2013.01)

(58) Field of Classification Search
CPC ....... H04L 41/22; H04L 41/14; H04L 43/045; H04L 41/5006; H04L 41/5009;
(Continued)

(56) References Cited

U.S. PATENT DOCUMENTS

| 8,185,824 B1 * | 5/2012 | Mitchell | H04L 41/044 715/734 |
| 8,352,651 B2 * | 1/2013 | Parfitt | G05B 19/054 326/38 |

(Continued)

FOREIGN PATENT DOCUMENTS

| AU | 2003241523 B2 * | 8/2009 | ......... H04L 41/0681 |
| BR | 102013028304 A2 * | 9/2015 | ........... G05B 19/048 |

(Continued)

OTHER PUBLICATIONS

Solarwinds, "Administrator Guide: Network Performance Monitor, Version 12.2" https://www.solarwinds.eom/ko/-/media/ 47f530f60d744f0ab2b1c906c005c0a0.ashx (Year: 2018).*

*Primary Examiner* — Steven P Sax
(74) *Attorney, Agent, or Firm* — Fredrikson & Byron, P.A.

(57) ABSTRACT

Provided herein are systems and methods of investigating an entity or a potential incident. A tracker engine may receive an identification of a first entity in a networked environment. The tracker engine may display, in a user interface responsive to receiving the identification, a representation of the first entity, and representations of a plurality of entities associated with the first entity. The plurality of associated entities may include: a network connection, a file, a process, a user or a computing device. The tracker engine may receive, via the user interface, a selection of a second entity from the plurality of associated entities. The tracker engine may update, responsive to receiving the selection, the user interface to display a representation of the second entity graphically linked to the representation of the first entity, and representations of a plurality of entities associated with the second entity.

18 Claims, 25 Drawing Sheets

(51) Int. Cl.
*H04L 43/045* (2022.01)
*H04L 41/14* (2022.01)

(58) Field of Classification Search
CPC ..... H04L 41/16; H04L 41/0883; H04L 12/08; H04L 63/20; H04L 5/006; H04L 67/16; G06F 3/0482; G06F 3/04812; G06F 3/0484; G06F 3/0488; G06F 3/147; G06Q 10/20; G06Q 10/06393; H04W 84/12; G05B 23/0297; G05B 19/048
See application file for complete search history.

(56) References Cited

U.S. PATENT DOCUMENTS

| | | | | |
|---|---|---|---|---|
| 8,452,876 | B1* | 5/2013 | Williams | H04L 41/22 709/227 |
| 8,477,112 | B2* | 7/2013 | Lee | G06F 3/0482 715/810 |
| 8,564,543 | B2* | 10/2013 | Chaudhri | G06F 1/1694 345/173 |
| 8,793,572 | B2* | 7/2014 | Grams | G06T 11/60 715/247 |
| 9,111,088 | B2* | 8/2015 | Ghai | H04L 41/28 |
| 9,733,796 | B2* | 8/2017 | Warner | G06F 3/0482 |
| 10,462,004 | B2* | 10/2019 | Hsiao | G06F 3/04842 |
| 10,728,120 | B2* | 7/2020 | Beyer | H04L 43/045 |
| 10,812,319 | B1* | 10/2020 | Prakash | H04L 41/046 |
| 11,343,143 | B2* | 5/2022 | Hay | H04L 41/0816 |
| 2003/0221005 | A1* | 11/2003 | Betge-Brezetz | H04L 41/5032 709/224 |
| 2007/0180385 | A1* | 8/2007 | Somasundaram | H04L 41/22 715/738 |
| 2010/0185984 | A1* | 7/2010 | Wright | G06F 16/29 715/833 |
| 2011/0072506 | A1* | 3/2011 | Law | H04L 63/20 726/11 |
| 2012/0221954 | A1* | 8/2012 | Tanaka | H04L 41/22 715/736 |
| 2013/0019172 | A1* | 1/2013 | Kotler | G06F 3/0488 715/711 |
| 2013/0031037 | A1* | 1/2013 | Brandt | H04L 63/1408 706/12 |
| 2013/0219314 | A1* | 8/2013 | Greifeneder | G06F 3/04842 715/767 |
| 2014/0068033 | A1* | 3/2014 | Berger | H04L 41/0846 709/221 |
| 2014/0108982 | A1* | 4/2014 | Pasceri | G06F 3/0486 715/769 |
| 2014/0122946 | A1* | 5/2014 | Berg | G06F 11/0766 714/57 |
| 2014/0320502 | A1* | 10/2014 | Fletcher | G06T 11/206 345/440.2 |
| 2015/0370529 | A1* | 12/2015 | Zambetti | G06F 3/0482 345/156 |
| 2016/0062584 | A1* | 3/2016 | Cohen | G06F 3/0488 715/784 |
| 2016/0065505 | A1* | 3/2016 | Iskander | G06F 3/0488 715/752 |
| 2017/0171040 | A1* | 6/2017 | Randolph | H04W 24/04 |
| 2017/0329808 | A1* | 11/2017 | Lachman | H04W 4/38 |
| 2017/0353366 | A1* | 12/2017 | Nasgowitz | H04L 41/12 |
| 2017/0354858 | A1* | 12/2017 | Lewis | G01S 17/88 |
| 2018/0068476 | A1* | 3/2018 | Ono | G06F 3/04815 |
| 2019/0197785 | A1* | 6/2019 | Tate-Gans | G06T 19/006 |
| 2020/0218482 | A1* | 7/2020 | Park | F25D 29/00 |
| 2020/0371663 | A1* | 11/2020 | Rubinstein | G06F 3/04817 |
| 2021/0150731 | A1* | 5/2021 | Saquib | G06T 19/20 |
| 2021/0266231 | A1* | 8/2021 | Khetarpal | H04L 41/22 |

FOREIGN PATENT DOCUMENTS

| | | | | |
|---|---|---|---|---|
| CA | 2474879 | C * | 4/2013 | ........ G06F 9/46 |
| CA | 3022864 | A1 * | 1/2017 | ........ G06F 16/3344 |
| CA | 3025915 | A1 * | 5/2020 | ........ A61B 5/002 |
| CN | 102299909 | A * | 12/2011 | ........ H04L 63/0227 |
| CN | 108141389 | A * | 6/2018 | ........ H04L 41/22 |
| CN | 105103204 | B * | 3/2019 | ........ G08B 13/19656 |
| CN | 109936467 | A * | 6/2019 | |
| EP | 1903716 | A1 * | 3/2008 | ........ G05B 19/41885 |
| EP | 3232324 | A1 * | 10/2017 | ........ G05B 19/056 |
| ES | 2646632 | A2 * | 12/2017 | ........ G06F 9/5005 |
| FR | 2840139 | A1 * | 11/2003 | ........ H04L 41/22 |
| GB | 2474545 | A * | 4/2011 | ........ H04L 63/0227 |
| JP | 4718967 | B2 * | 7/2011 | |
| JP | 2021044717 | A * | 3/2021 | ........ G06T 11/206 |
| WO | WO-2015027761 | A1 * | 3/2015 | ........ H04L 41/22 |

* cited by examiner

SYSTEMS AND METHODS FOR INVESTIGATING POTENTIAL INCIDENTS ACROSS ENTITIES IN NETWORKED ENVIRONMENTS

TECHNICAL FIELD

The present application relates generally to systems and methods for checking entities in networked environments operations, including but not limited to systems and methods for investigating potential incidents across entities in networked environments.

BACKGROUND

Nodes may communicate with one another across one or more communication sessions established across a networked environment, and may exchange data between themselves. Furthermore, various operations may be performed with respect to the data.

SUMMARY

Described herein are systems and methods for investigating an entity, or a potential incident across entities, in one or more networked environments. A networked environment may include a multitude of entities, such as users, files (e.g., classified filed), events, processes (e.g. applications, programs), clients, servers, databases, communication sessions (or network connections), registries, alarms (e.g., alerts), MD5 hashes, and/or peripheral devices, related to one another via various operations. For example, a user associated with a client can request for a file on a database via using an application to print out via a printer. The application may have resources that are hosted on a server accessible via a network connection between the client and the server. In this example, the file may have been uploaded onto the database by another user associated with another client executing yet another application in the networked environment. With more and more interfacing among the entities across the networked environment, there may be an ever greater plethora of interrelations among the entities.

A diagnostic or monitoring tool or system (hereinafter generally referred to as a diagnostic tool) executing on a computing device may be used to investigate, check, explore, keep track and/or log various operations occurring throughout the networked environment, including the communication among the various entities. Upon request, the diagnostic tool may display the log of the multitude of entities and operations detected throughout the network environment, for instance, in a delimited or list format. Based on the log, an administrator of the network may pinpoint potentially vulnerable points in the network and take precautionary measures to safeguard against such points. While the log may allow access to the recorded entities and operations occurring throughout the network, the raw data in the delimited or list format may not be easily or readily consumed and analyzed by the administrator operating the diagnostic tool. As such, the log may be of limited utility, and may result in a myriad of weak points in the network going unnoticed or being overlooked.

To increase the utility of such a diagnostic tool, a tracker engine may generate and/or provide a workspace to present a graphical and/or interactive visualization of entities and various operations performed among the entities. In providing the workspace, the tracker engine may identify the entities across the networked environment, including the individual users, files, events, processes, clients, servers, communication sessions, databases, and peripheral devices, among others. For each entity, the tracker engine may gather, trace, or aggregate more information on the entity, such as operations performed by the entity or on the entity by another entity and the time at which the operations are performed. The operations may include, for example: file-related operations (e.g., executing, copying, downloading, uploading, transferring, copying, renaming, printing, and emailing), data or content-related operations (e.g., reading, writing, and clipboard functions), or communication operations (e.g., establishing communication sessions or accessing a network location), among others. In aggregating information, the tracker engine may also gather descriptive metadata of each entity, such as an associated user, a location (e.g., on file system or network address), an application identifier (e.g., file name), a data type (e.g., document, image, video, and executable), or an entity type (e.g., user, file, process, client, server, database, and peripheral device), among others.

From the aggregated information, the tracker engine may determine or generate associations among the entities of the networked environment. The associations may indicate relationships between one entity and the other entities in the network. Each relationship between a pair of entities may indicate that some sort of operation affected or involved both. For example, one entity may be a user and the other entity may be a file, and may be related to each other with the user of a computing device having accessed the file maintained on a remote cloud server. In some cases, one of the entities may form the relationship between other entities. For example, one entity may be an application and another entity may correspond to a security alert (an instance of an event), and may be related to each other with the application having performed an operation in contravention to a security policy for the network.

With these determinations, the tracking engine may generate an interactive, graphical representation of the associations among the entities for presentation in a user interface for the workspace managed by the tracking engine. The graphical representation may include nodes representing respective entities and connections between pairs of nodes representing the corresponding associations. Each node or connection may be adorned with or represented by an icon providing additional information, such as number of instances, pattern matches, entity types, and descriptive metadata, among others. With respect to the graphical representation, the workspace may include another number of features to modify visualization of the entities and/or related events to the entities. For example, the workspace may include or support scroll, zoom, pan, highlight, a hover over, and selection on a particular node representing an entity.

Upon interaction with one of the nodes or connection, the workspace may include additional information on the related file instance or event. In particular, the workspace may include a pivot function on each of the nodes and connections in the graphical representation to allow for the user to pull or obtain addition information. The pivot function may allow the user to select an entity for further investigation and analysis. By interacting with one of the nodes or connections, the tracking engine may identify the corresponding entity as an "anchor entity." From the anchor entity, the tracking engine may identify other associated entities and may highlight the corresponding nodes and connections in the workspace. The user can make further interaction with the highlighted nodes or connections to make further evaluations of the entities in the networked environment.

In this manner, the tracking engine may allow the user of the diagnostic tool to more readily access information on each of the various entities and relationships among the entities of the networked environment. With graphical representations, the workspace may allow the user to more readily identify or pinpoint potentially vulnerable points in the network environment and take precautionary countermeasures. With the vulnerable points identified and precautionary measures taken using the pivot function of the workspace, the overall security of the network environment may be enhanced.

At least one aspect is directed to a system for investigating a potential incident. The system may include a user interface. The system may include a tracker engine executable on at least one processor. The tracker engine may receive an identification of a first entity in a networked environment to initiate an investigation. The tracker engine may display, in the user interface responsive to receiving the identification of the first entity, (i) a representation of the first entity, and (ii) representations of a plurality of entities associated with the first entity in the networked environment. The plurality of entities associated with the first entity may include at least one of: a network connection, a file, a process, a user or a computing device, for example. The tracker engine may receive, via the user interface, a selection of a second entity from the plurality of entities associated with the first entity. The tracker engine may update, responsive to receiving the selection of the second entity, the user interface to display (a) a representation of the second entity graphically linked to the representation of the first entity, and (b) representations of a plurality of entities associated with the second entity in the networked environment.

In some embodiments, the tracker engine may receive user input via the user interface to pin (or maintain) at least one of the representation of the first entity or the representation of the second entity, within a display portion of the user interface. In some embodiments, the tracker engine may tag the at least one of the representation of the first entity or the representation of the second entity that is pinned, with a description.

In some embodiments, the plurality of entities associated with the first entity may be grouped by entity types, and the representations of the plurality of entities associated with the first entity may include a representation of each of the entity types. In some embodiments, the tracker engine may receive a selection of a first entity type of the entity types. In some embodiments, the tracker engine may display, responsive to the selection of the first entity type, information about a subset of plurality of entities associated with the first entity that is of the first entity type In some embodiments, the tracker engine may display information about the plurality of entities associated with the first entity in a display portion of the user interface, when displaying the representations of the plurality of entities associated with the first entity. In some embodiments, the tracker engine may update the display portion to display information about the plurality of entities associated with the second entity, when displaying the representations of the plurality of entities associated with the second entity.

In some embodiments, the tracker engine may receive, via the user interface, an instruction to pivot from the second entity to a third entity from the plurality of entities associated with the second entity. In some embodiments, the tracker engine may update, responsive to receiving the instruction, the user interface to display a representation of the third entity, and representations of a plurality of entities associated with the third entity in the networked environment.

In some embodiments, the tracker engine may identify the plurality of entities associated with the first entity, and the plurality of entities associated with the second entity, for a defined window of time. In some embodiments, the tracker engine may display, in a graph or tree format, the representation of the second entity graphically linked to the representation of the first entity.

At least one aspect is directed to a method of investigating a potential incident. A tracker engine executable on at least one processor may receive an identification of a first entity in a networked environment to initiate an investigation. The tracker engine may display, in the user interface responsive to receiving the identification of the first entity, (i) a representation of the first entity, and (ii) representations of a plurality of entities associated with the first entity in the networked environment. The plurality of entities associated with the first entity may include at least one of: a network connection, a file, a process, a user or a computing device. The tracker engine may receive, via the user interface, a selection of a second entity from the plurality of entities associated with the first entity. The tracker engine may update, responsive to receiving the selection of the second entity, the user interface to display (a) a representation of the second entity graphically linked to the representation of the first entity, and (b) representations of a plurality of entities associated with the second entity in the networked environment.

In some embodiments, the tracker engine may receive user input via the user interface to pin at least one of the representation of the first entity or the representation of the second entity, within a display portion of the user interface. In some embodiments, the tracker engine may tag the at least one of the representation of the first entity or the representation of the second entity that is pinned, with a description.

In some embodiments, the plurality of entities associated with the first entity may be grouped by entity types, and the representations of the plurality of entities associated with the first entity may include a representation of each of the entity types. In some embodiments, the tracker engine may receive a selection of a first entity type of the entity types. In some embodiments, the tracker engine may display, responsive to the selection of the first entity type, information about a subset of plurality of entities associated with the first entity that is of the first entity type In some embodiments, the tracker engine may display information about the plurality of entities associated with the first entity in a display portion of the user interface, when displaying the representations of the plurality of entities associated with the first entity. In some embodiments, the tracker engine may update the display portion to display information about the plurality of entities associated with the second entity, when displaying the representations of the plurality of entities associated with the second entity.

In some embodiments, the tracker engine may receive, via the user interface, an instruction to pivot from the second entity to a third entity from the plurality of entities associated with the second entity. In some embodiments, the tracker engine may update, responsive to receiving the instruction, the user interface to display a representation of the third entity, and representations of a plurality of entities associated with the third entity in the networked environment.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

It should be understood that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the concepts disclosed herein will become more apparent from the detailed description set forth below when taken in conjunction with the drawings.

DETAILED DESCRIPTION

Following below are more detailed descriptions of various concepts related to, and embodiments of, inventive systems and methods for investigating potential incidents across entities in networked environments. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes a network environment and computing environment which may be useful for practicing various computing related embodiments described herein.

Section B describes systems and methods for investigating entities or potential incidents across entities, in one or more networked environments.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A. Computing and Network Environment

Prior to discussing specific embodiments of the present solution, it may be helpful to describe aspects of the operating environment as well as associated system components (e.g., hardware elements) in connection with the methods and systems described herein.

Figure 1A:
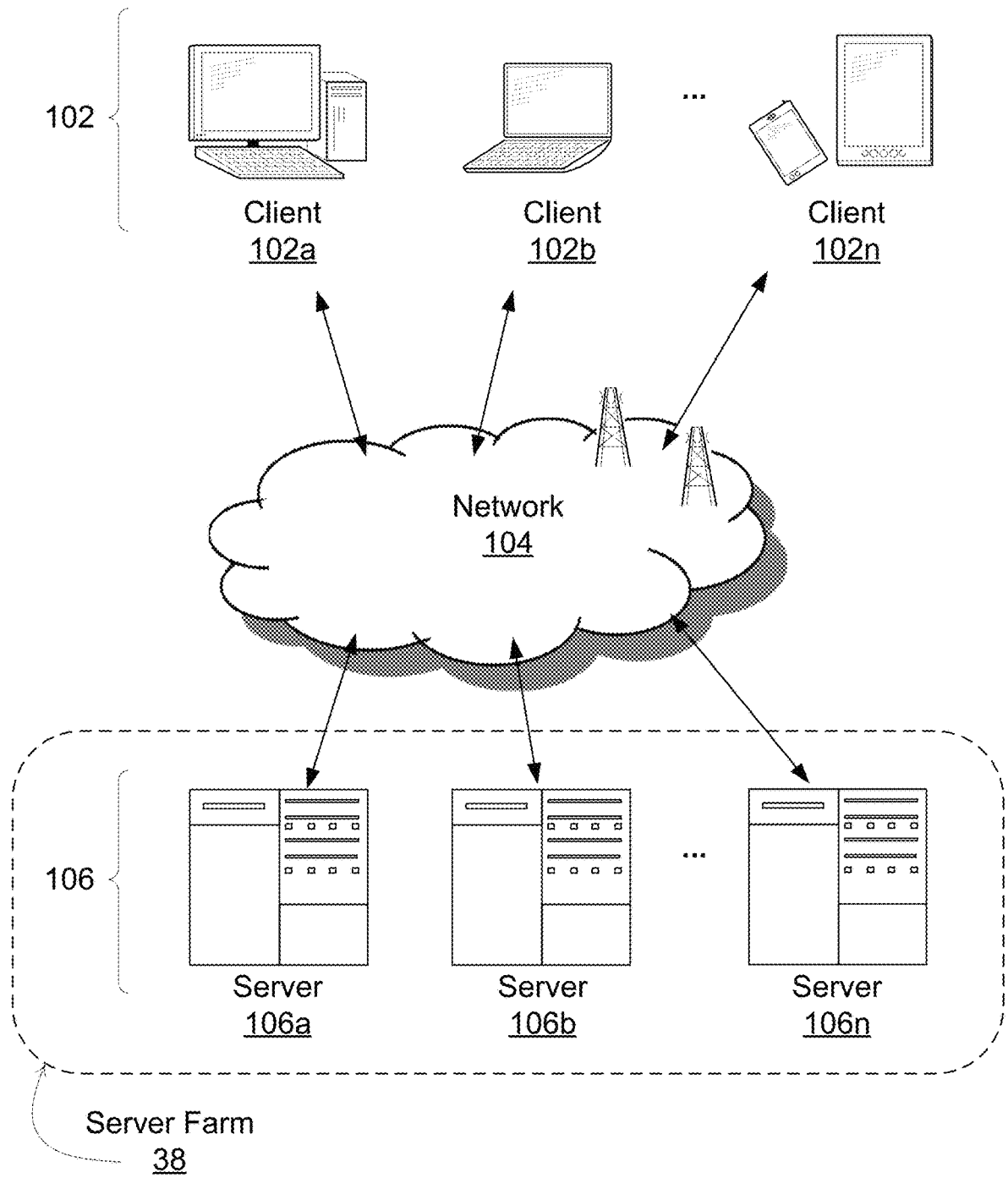
FIG. 1A is a block diagram depicting an embodiment of a network environment comprising client devices in communication with server devices.

Referring to FIG. 1A, an embodiment of a network environment is depicted. In brief overview, the illustrated exploring network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106. The clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network, which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
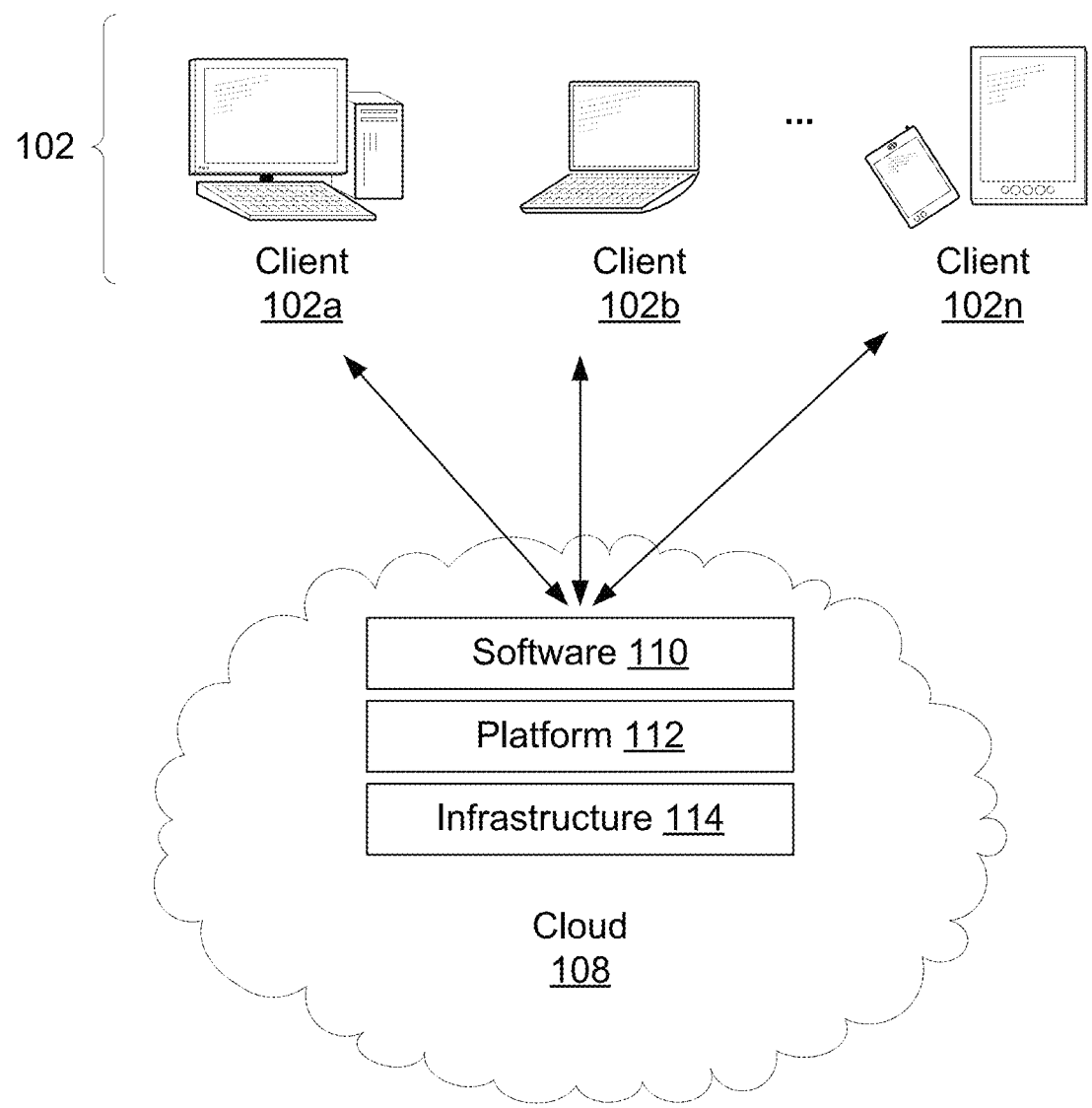
FIG. 1B is a block diagram depicting a cloud computing environment comprising client devices in communication with a cloud service provider.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
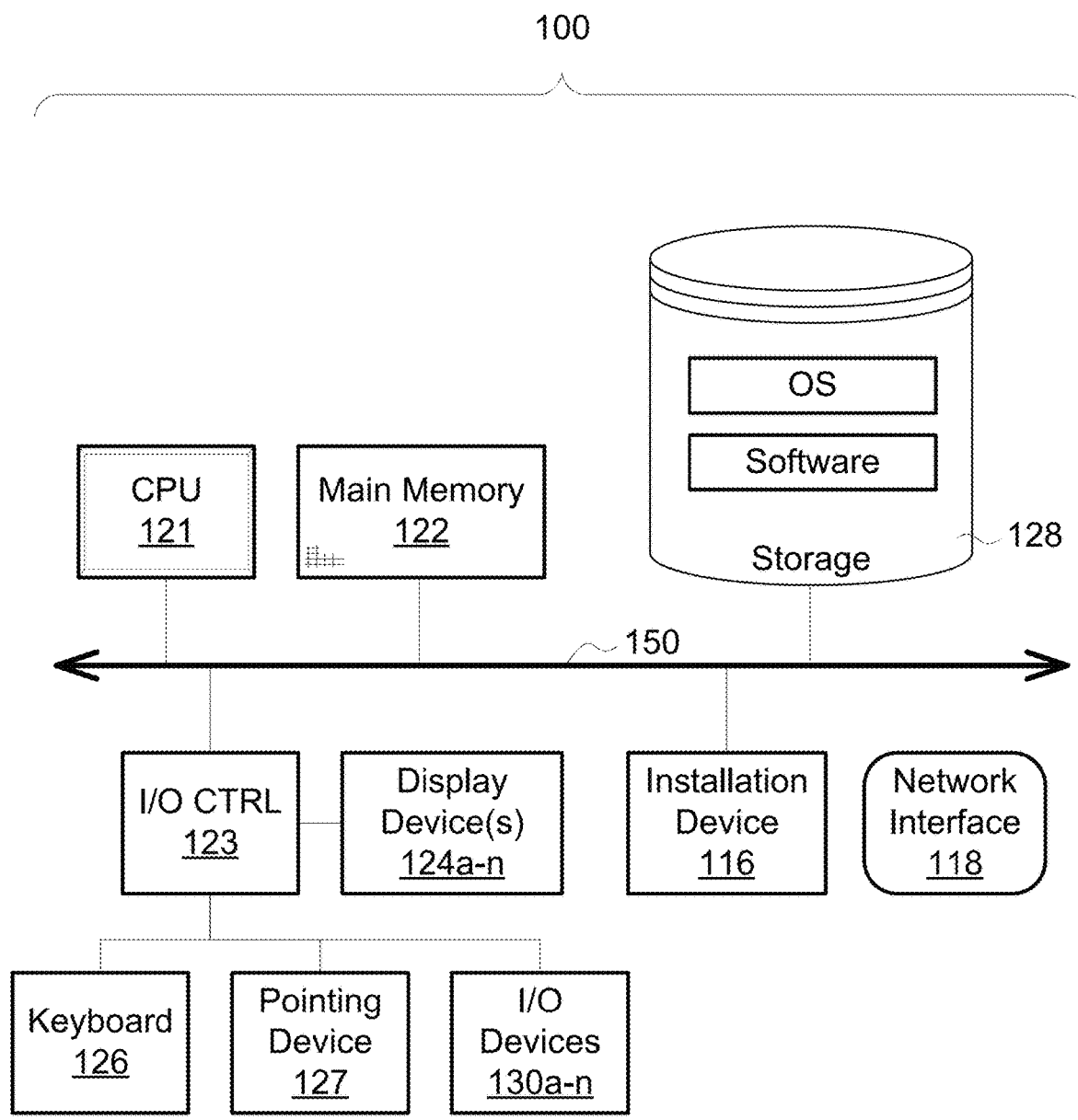
FIGS. 1C and 1D are block diagrams depicting embodiments of computing devices useful in connection with the methods and systems described herein.
Figure 1D:
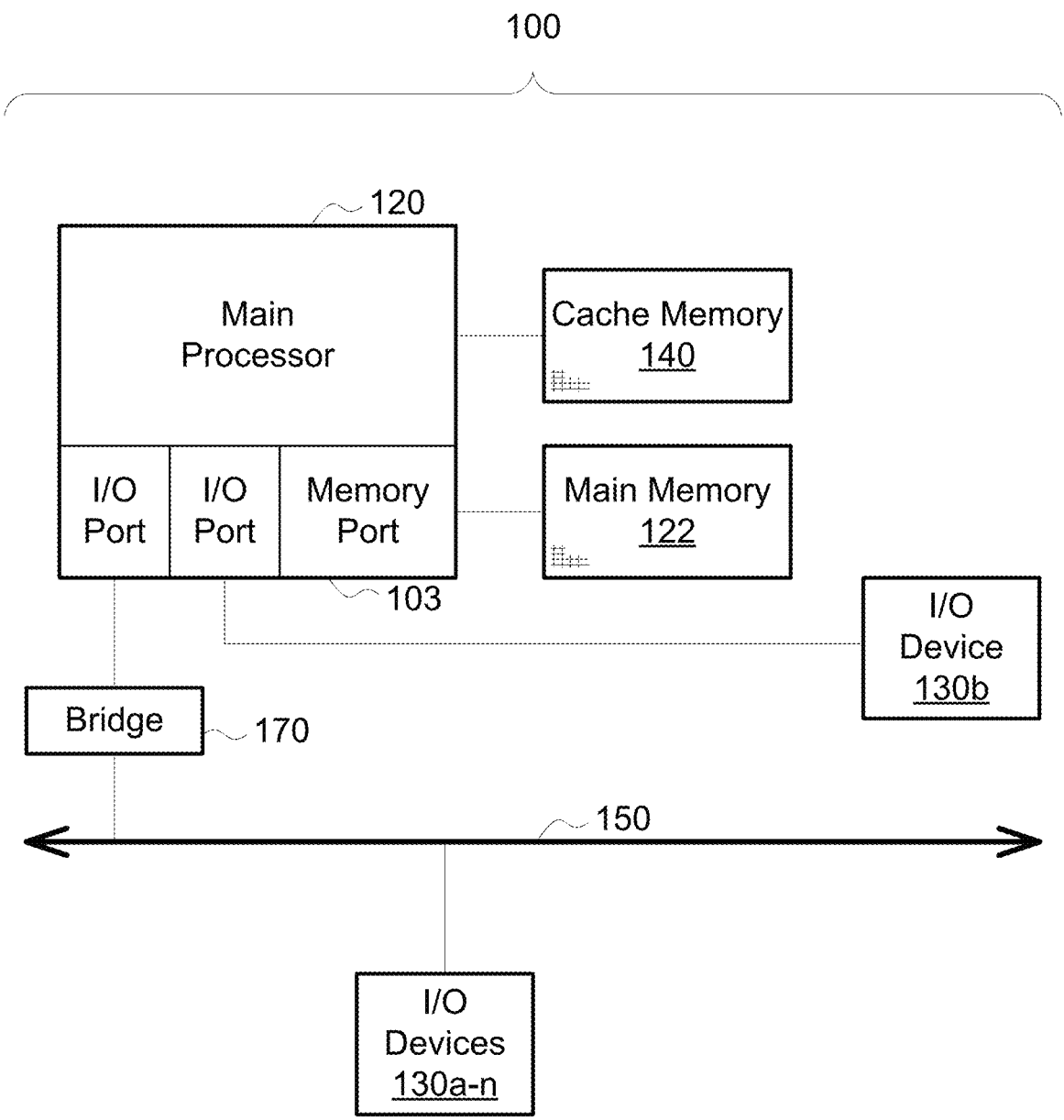

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, and/or software 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call. In some embodiments, the communication device 102 is a wearable mobile computing device including but not limited to Google Glass and Samsung Gear.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Investigating a Networked Environment

Figure 2:
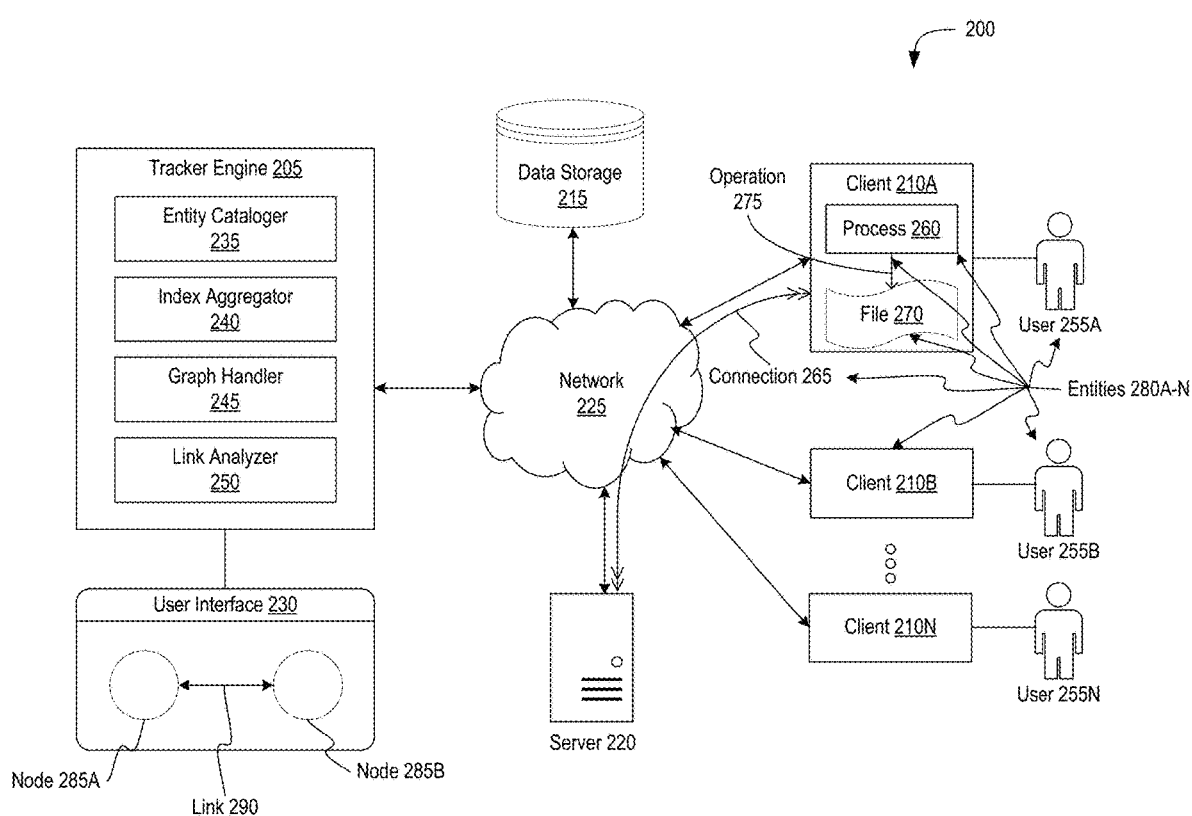
FIG. 2 is a block diagram depicting an example embodiment of a system for investigating entities or potential incidents across entities in networked environments.

Referring now to FIG. 2, depicted is a block diagram of an embodiment of a system 200 for investigating entities or potential incidents across entities in one or more networked environments. In overview, the system 200 may include at least one tracker engine 205, one or more clients 210A-N (hereinafter generally referred to as clients 210), at least one data storage 215, at least one server 220, and at least one network 225, among others. The tracker engine 205 may handle, drive, and/or provide at least one user interface 230 (sometimes referred herein as a workspace). The tracker engine 205 may include at least one entity cataloger 235, at least one index aggregator 240, at least one graph handler 245, and at least one link analyzer 250 among others. The network 225 may communicatively couple the tracker engine 205, the one or more clients 210, the data storage 215, the peripheral device 220, and the user interface 230 with one another.

Each of the above-mentioned elements or components (e.g., the tracker engine 205 and its components, the clients 210, the data storage 215, and the server 220) is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1A-1D, in some embodiments, as detailed in section A.

In further detail, the components or entities of the system 200 as well as the events that occur therein may be related to one another. Each client 210 may be associated with a corresponding user 255A-N (hereinafter generally referred to as user 255). For example, the user 255 may be authenticated (e.g., using an account identifier and passcode) to operate the client 210 via input/output (I/O) devices connected thereto. At least one of the clients 210 (e.g., the first client 210A as depicted) may execute at least one process 260. The process 260 may correspond to a program, an application, a script, or any other executable running on or accessible via the client 210. For example, as depicted, the user 255A may use the client 210A to load and run the process 260, thereby associating the client 210A, the process 260, and the user 255A with one another. In addition, one or more components in the system 200 (e.g., the client 210, the data storage 215, and the server 220) may establish at least one connection 265 over the network 225. For example, as depicted, the first client 210A may establish a connection 265 with the server 220 to exchange communications, at the request for the user 255A through the process 260. By establishing communications via the connection 265, the first client 210A, the server 220, the user 255, the process 260, and the connection 265 may be associated with one another.

The connection 265 may be established and maintained in accordance with any number of communications protocols, such as Transmission Control Protocol (TCP), Internet Protocol (IP), and User Datagram Protocol (UDP), among others. Additionally, at least one of the clients 210 (e.g., the first client 210A as depicted) may store and maintain a file 270. The file 270 may contain, hold, or otherwise include data (sometimes referred herein as contents). The file 270 may be of a particular file format, such as: a document file (e.g., .DOCX, .PDF, .XLS, .PPTX, .PS, .DVI, or .HTML), an image file (e.g., .GIF, .JPEG, or .BMP), an audio file (e.g., .WAV, .AIFF, or .MPEG), a video file (e.g., .WMV, .MPG, or .MOV), a text file (e.g., .TXT), and a database file (e.g., .MDB, .MDF, or .DB), among others. The location of the file 270 may be referenced in accordance with a file system of the device or a web address (e.g., a file path or a Universal Resource Locator (URL)) on the network 225. The address for the file 270 may include a set of alphanumeric characters, such as a combination of a device or drive, a directory, a subdirectory, and a file name, among others. The file 270 may also include or be associated with descriptive metadata in accordance with a file format. The metadata for the file 270 may include, for example: an author, author information, a version number, a data created, a date last modified, a content length, and a file size, location, classification, file permission status (e.g., readable, writable, or executable), among others. The file 270 may be associated with the client 210 on which the file 270 is stored and the user 255 via association with the client 210.

Furthermore, at least one of the processes 255 running on the client 210 may perform at least one operation 270 on the file 270. For example, as depicted, the process 260 executing on the first client 210A may perform a read and write operation as directed by the user 255A on the file 270 stored on the first client 210A. The operation 270 may be data-related operations to access and edit the contents of the file 270, such as: a file open, a file write; a file content edit; copy and paste; and a print operation, among others. The operation 270 may be file-related operations to modify the file 270 itself, such as: a file copy; a file move; a network upload (e.g., to upload to the data storage 215, the server 220, or another client 210); an email with the file 270 attached; a file permission update; and a copy to storage, among others. Via the performance of the operation 270, the operation 270 itself, the process 260 that called the operation 270, the file 270 upon which the operation 270 is performed, the client 210 (e.g., the first client 210A) running the process 260 that is performing the operation or storing the file 270, and the user 255 (e.g., the user 255A) may be entities associated with one another. In some embodiments, at least one of the operations 270 may be determined by one of the components in the system 200 (e.g., the first client 210A or the server 220) as to whether the operation 270 is in conformance with a security protocol. When not in conformance with the security protocol, the operation 270 may be marked with an alert or alarm.

Within the system 200, the components and the events occurring therein may correspond to one of a set of entities 280A-N (hereinafter generally referred to as an entity 280). Each client 210, data storage 215, server 220, process 260, the file 270, the user 255, and the operation 270, among others, may be considered as or may correspond to one of the entities 280. Each entity 280 may correspond to any one or more of the client 210, the data storage 215, the server 220, the process 260, the file 270, the user 255, or the operation 270, among others. At least one entity 280 in the system 200 may be related to or associated with another entity 280. The relationship or association may be via another entity 280. For example, the client 210A (an example of an entity 280) and the server 220 (another example of an entity 280) may be associated with each other via the connection 265 (another example of an entity 280).

The entity cataloger 235 executing on the tracker engine 205 may identify each entity 280 in the system 200. In some embodiments, the entity cataloger 235 may identify an entity type for each entity 280. The entity type may correspond to the client 210, the data storage 215, the server 220, the process 260, the file 270, the user 255, or the operation 270, among others. To identify the components (e.g., the client 210, the data storage 215, and the server 220) of the network 225, the entity cataloger 235 may monitor communications through the network 225. For example, the entity cataloger 235 may scan and parse packets in the network 225 to identify a source device and a destination device, corresponding to one of the client 210, the data storage 215, and the server 220. The identification of the connections 265 established via the network 225 may also be performed by the entity cataloger 235 in a similar manner. For example, the entity cataloger 235 may scan and parse packets communicated through the network 225 to identify a session ticket or identifier uniquely referencing the connection 265. In some embodiments, the entity cataloger 235 may parse the packets to identify timestamps that indicate a time and date at which the packet is transmitted.

Furthermore, to identify the processes 260 and files 270 executing on or accessible via the devices (e.g., on the clients 210 or server 220), the entity cataloger 235 may access the file system of each device to identify the processes 260 and files 270 maintained thereon. In some embodiments, the file indexer 235 may receive a list of processes 255 and files 260 permitted to be investigated by the tracker engine 205 from each of the devices (e.g., the clients 210 and the server 220). For example, the user 255A of the first client 210A may send the list including the process 255 and the file 260 to the entity cataloger 235. In some embodiments, the entity cataloger 235 may identify metadata associated with the process 255 or the file 260. The entity cataloger 235 may also identify each user 255 associated with the corresponding client 210. For example, the entity cataloger 235 may access the client 210 to identify an account identifier of the user 255 that logged in and is authenticated for use of the client 210. In some embodiments, the entity cataloger 235 may identify times at which the user 255 logged into the client 210.

In addition, the entity cataloger 235 may access each device (e.g., the client 210, the data storage 215, and the server 220) to monitor for one or more operations 275. Upon detecting the operation 275, the entity cataloger 235 may log the operation 275. In some embodiments, the entity cataloger 235 may access the device to retrieve the log of operations 275 maintained by the device. For each identified operation 260, the entity cataloger 235 may identify an operation type. The operation type may include, for example, data-related operations (e.g., a file open; a file write; a file content edit; copy and paste; and a print operation), file-related operations (e.g., a file copy; a file rename; a file move; a network upload; email; a file permission update; and a copy to storage), or a communication operation, among others. For each identified operation 275, the entity cataloger 235 may identify metadata, such as a timestamp corresponding to a date and time at which the operation 275 is performed.

The index aggregator 240 executing on the tracker engine 205 may determine or identify an association among the identified entities 280. For each identified entity 280, the index aggregator 240 may identify one or more associated entities 280. The identification of the association (sometimes referred herein as a relationship or a link) may be based on at least one connection between a respective pair of the entities 280. The connection between a pair of entities 280 may be through another entity 280. The identification of the association between the pair of entities 280 may be based on the entity types in the pair of entities 280. When the identified entity 280 is a device (e.g., one of the clients 210, the data storage 215, and the server 220), the index aggregator 240 may identify the association with another device via the connection 265 over the network 225. For example as depicted, the index aggregator 240 may identify the first client 210A (one example of an entity 280) as associated with the server 220 (another example of an entity 280) via the connection 265 (a third example of an entity 280) established between the two. When the identified entity 280 is the connection 265, the index aggregator 240 may identify one or more of the devices that use the connection 265 to communicate as associated with the connection 265.

In addition, the index aggregator 240 may identify the process 260 or the file 270 making use of the connection 265 as associated. When the identified entity 280 is a device, the index aggregator 240 may also identify the association with a process 260 or a file 270 based on a location of the process 260 or the file 270. For example in the depiction, the index aggregator 240 may identify the first client 210A (one example of the entity 280) as associated with process 260 and the file 270 (other examples of entities 280) as both are stored and run from the first client 210A). Conversely, when the identified entity 280 is a process 260 or file 270, the index aggregator 240 may identify the process 260 or the file 270 associated with the device (e.g., the client 210) based on the location in a similar fashion.

Furthermore, when the identified entity 280 is a process 260 or file 270, the index aggregator 240 may identify the process 260 or the file 270 associated with each other based on at least one operation 275. The operation 275 may be performed by the process 260 on the file 270. For example, the index aggregator 240 may identify the process 260 and the file 270 associated with each other based on a file edit operation called by the process 260 on the file 270. When the identified entity 280 is the user 255, the index aggregator 240 may identify the client 210 that the user 255 is logged into or operating as associated with the user 255. The index aggregator 240 may also identify the process 260 that the user 255 is interacting with via the client 210 as associated with the user 255. Based on the identifications of the associations between pairs of entities 280, the index aggregator 240 may identify additional associations across different pairs, with multiple degrees of associations.

In some embodiments, the index aggregator 240 may identify the associations within a defined window of time (e.g., ranging from 30 seconds to 5 years). Even if a connection is found between a pair of entities 280, the index aggregator 240 may discount or discard the association when the connection is based on a time outside the defined window of time. For example, the first client 210A may have established the connection 265 with the server 220 more than 2 years ago. In this example, if the defined window of time is a year or less, the index aggregator 240 may discard the association between the first client 210A and the server 220 via the connection 265. In some embodiments, when an association is identified, the index aggregator 240 may store the association for future retrieval and use.

The graph handler 245 executing on the tracker engine 205 may generate a representation of the entities 280 and the associations among the entities 280 for presentation via the user interface 230. The user interface 230 presented by the tracker engine 205 via a display of a computing device (e.g., of the network administrator or one of the clients 210). In some embodiments, the graph handler 245 may generate the representation using the initial identification of the entities 280. The graphical representation to be rendered via the user interface 230 may be in a graph format or a tree format. For example, as depicted, the graphical representation on the user interface 230 include a set of nodes 285A-N (hereinafter generally referred to as nodes 285) and at least one link 290. In some embodiments, the graph handler 245 may render the information on the entities 280 for display via the user interface 230.

In the user interface 230, each node 285 may represent or correspond to one of the entities 280, such as the client 210, the data storage 215, the server 220, the process 260, the connection 265, the file 270, and the operation 275, among others. The nodes 285 may be, for example, a shape (e.g., a circle as shown), an icon, or another graphic. In some embodiments, the generation and display of the nodes 285 based on the entity type of the entity 280 represented by the node 285. For example, for a file 270 the corresponding node 285 may include an file icon and for a device 210A the respective node 285 may include a computer monitor icon. Each link 290 may represent or correspond to an association between at least a pair of entities 280, and may span between multiple nodes 285 corresponding to the entities 280. Visually, each link 290 may be, for example, an arrow (e.g., a bidirectional arrow as shown or a unidirectional arrow), a line, or another graphic showing a connection between the respective nodes 285. In some embodiments, the graph handler 245 may omit rendering and displaying of the links 290 until selection of another node 285.

The user interface 230 may include one or more functions to be performed by the tracker engine 205 with respect to each of the graphical representations of the entities 280 and associations, such as the nodes 285 and the links 290. The functions of the user interface 230 may include, for example: a pin function, a tag function, a drill down function (sometimes referred herein as a filter function), and a pivot function, among others. The pin function may maintain a visual focus on the selected node 285 or link 290 within the user interface 230. The tag function may allow addition of a description (e.g., in the form of an indication) to the node 285 or the link 290. In some embodiments, the node 285 or link 290 to be tagged may be selected via the pin function. The drill down function may restrict or limit the associated entities 280 to be investigated by the tracker engine 205 to a subset based on a constraint (e.g., an entity type or time frame). The pivot function may change the associated entity 280 to be investigated from one entity 280 to another entity 280. Which function of the user interface 230 is triggered may be dependent on the selection of the nodes 285, the links 290, and other elements rendered on the user interface 230, or the I/O device of the computing device displaying the user interface 230. Using the graphical representation displayed via the user interface 230, a user of the tracker engine 205 may analyze each entity 280 represented by the nodes 285 and the associations among the entities 280 as represented by the links 290. The user may interact with one of the nodes 285 of the user interface 230 to select the corresponding entity 280. In conjunction, the user may also interact with a user interface element on the user interface 230 to select one of the functions.

The link analyzer 250 executing on the tracker engine 205 may retrieve, receive, or identify at least one entity 280 to initiate an investigation. In some embodiments, the link analyzer 250 may receive or identify the entity 280 to be investigated by the tracker engine 205 via the user interface 230. The entity 280 identified may be referred to as an "initial entity" or an "anchor entity," and may serve as an initial starting point of investigation of entities 280 within the system 200. In some embodiments, the link analyzer 250 also receive or identify the function to be performed as selected via the user interface 230. With the identification of the initial entity 280, the link analyzer 250 may identify the entities 280 associated with the initial entity 280. In some embodiments, the identification of the associated entities 280 may be performed by the link analyzer 250 in the same manner as the index aggregator 240 detailed herein previously. In some embodiments, the link analyzer 250 may access the associations for the initial entity 280 stored by the index aggregator 240.

In some embodiments, the link analyzer 250 may perform additional processing to the identified initial entity 280 and associated entities 280. In some embodiments, the link analyzer 250 may group or categorize the associated entities 280 based on the entities types. For example, the link analyzer 250 may classify the associated entities 280 as one of devices (e.g., clients 210, data storage 215, or server 220), a process 260, a file 270, an operation 275, a connection 265, or a user 255, among others. In some embodiments, for each identified entity 280 (e.g., initial and associated), the link analyzer 250 may retrieve or identify additional information on the entity 280, such as the metadata, file path, network address, a communications protocol, and an operation type, among others. In some embodiments, the link analyzer 250 may retrieve or identify information about the entity type for each identified entity 280, such as individual entities 280 (e.g., by identifier or location) and the number of entities 280 falling under the entity type. With the identification of the information, the graph handler 245 may render, indicate or display the information identified by the link analyzer 250 for each associated entity 280.

Based on the function selected on the user interface 230, the graph handler 245 and the link analyzer 250 may also process the initial and associated entities 280 based on the function selected via the user interface 230. When the pin function is received, the graph handler 245 may maintain the graphical representation (e.g., the node 285) of the selected entity 280 within a display portion of the user interface 230. In addition, the graph handler 245 may render the information identified by the link analyzer 250 for the selected entity 280 in the display portion (e.g., using a prompt or a pop-up window). When the tag function is received, the graph handler 245 may generate and render a user interface element (e.g., a text box) for input of description. For example, the description may include "Reviewed," "Needs Review," "Compromised Host," "Compromised User Account," "Needs Scan," and "Indicator of Compromise," among others. Upon receipt of the input, the link analyzer 250 may associate the description with the selected entity 280 and store the association.

In addition, when the drill down function is selected, the graph handler 245 may generate and render a user interface element for input of the constraints to filter the entities 280 to be investigated. The constraints may include the entity types of the associated entities 280 as identified by the link analyzer 250. For example, the user interface element may be a message box with a set of check boxes, each corresponding to an entity type (e.g., the client 210, the server 220, the data storage 215, the user 255, the process 260, the connection 265, the file 270, and the operation 275). The user may select one or more of the check boxes in the message box to filter the types of entities 280 associated with the initial entity 280 to be investigated. Upon receipt of the input, the link analyzer 250 may select or identify a subset of the associated entities 280 based on the constraint (e.g., entity type). The graph handler 245 in turn may generate and display the graphical representations (e.g., nodes 285 and links 290) corresponding to the subset of associated entities 280. In some embodiments, the graph handler 245 may render the information identified by the link analyzer 250 for the associated entities 280 of the subset.

Furthermore, when the pivot function is selected, the link analyzer 250 may identify or select the associated entity 280 different from the previously selected entity 280. Both the subsequently selected and previously selected entities 280 may be associated with the initial or anchor entity 280. In some embodiments, the link analyzer 250 may retrieve or identify the information regarding the subsequently selected and associated entity 280. With the subsequent identification, the graph handler 245 may generate and render graphical representations of the initial entity 280 and the subsequently selected entity 280 via the user interface 230. For example, the graph handler 245 may have initially displayed a first node 285A for the anchor entity 280 and a second node 285B for the previously selected associated entity 280. After the identification, the graph handler 245 may still display the same first node 285A for the anchor entity 280 but display a third node 285C for the subsequently selected entity 280.

The graph handler 245 may also render the additional information identified by the link analyzer 250 for the newly selected entity 280.

With repeated interactions with the graphical representations displayed via the user interface 230, the graph handler 245 may update the graphical representations. With the rendering of the node 285 representing the initial entity 280 and a set of other nodes 285 representing associated entities 280, the user may select one of the nodes 285 via the user interface 230 to further evaluate the corresponding entities 280. Subsequently, the graph handler 245 may receive the selection of the entity 280 associated with the initial entity 280 via the user interface 230 (e.g., using the corresponding node 285). Upon receipt of the selection, the graph handler 245 may display the link 290 between the nodes 285 representing the initial entity 280 and the selected entity 280. In addition, the link analyzer 250 may identify one or more entities 280 associated with the selected entity 280. The identification of the associated entities 280 may be performed in a similar manner as detailed herein above, except with respect to the selected entity 280. The graph handler 245 in turn may generate and display graphical representations corresponding to the identified, associated entities 280 (e.g., using nodes 285). In some embodiments, the link analyzer 250 may retrieve or identify the information on each identified associated entity 280 corresponding to the selected node 285 in the similar way as discussed above. The graph handler 245 may also generate and render the identified information for each identified associated entity 280.

Figure 3:
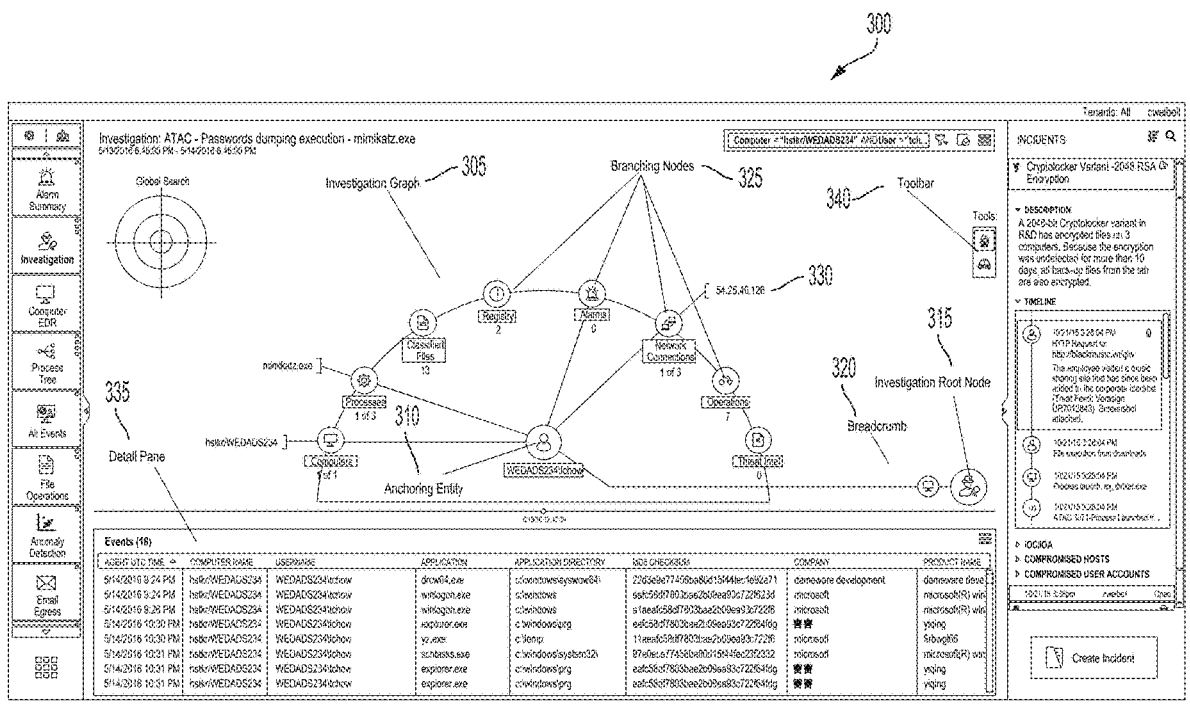
FIG. 3 is a screenshot depicting an example investigative graphical workspace with representations of entities in a networked environment.

Referring now to FIG. 3, depicted is a screenshot of an example investigative graphical workspace 300 with representations of entities (e.g., the entities 280) in a networked environment. The graphical workspace 300 may be an example of the user interface 230 generated and displayed via the tracker engine 205. In the example depicted, the graphical workspace 300 may have an investigation graph 305 generally in the middle of the display area. The investigation graph 305 may have element 310 (e.g., in the form of an icon) representing the anchoring entity. The default anchoring entity may be indicated in element 315, referred to as the investigation root node 315. Element 320 may indicate any entities 280 located or related, either downstream or upstream, between the entity 280 corresponding to the investigation root node 315 and the anchor entity 280 represented by the element 310. The investigation graph 305 may have one or more branching nodes 325 spanning from the element 310. Each of the branching nodes 325 may correspond to entities 280 associated with the anchoring entity 280. Near one or more of the branching nodes 325, the investigation graph 305 may have element 330 providing additional information about the entity 280 represented by the nearby node 325. In addition, the workspace 300 may have a detail panel 335 providing a log list of recorded events (e.g., operations 275) detected across the system 200. The workspace 300 may also have a toolbar 340 to control display of the investigation graph 300.

Figure 4:
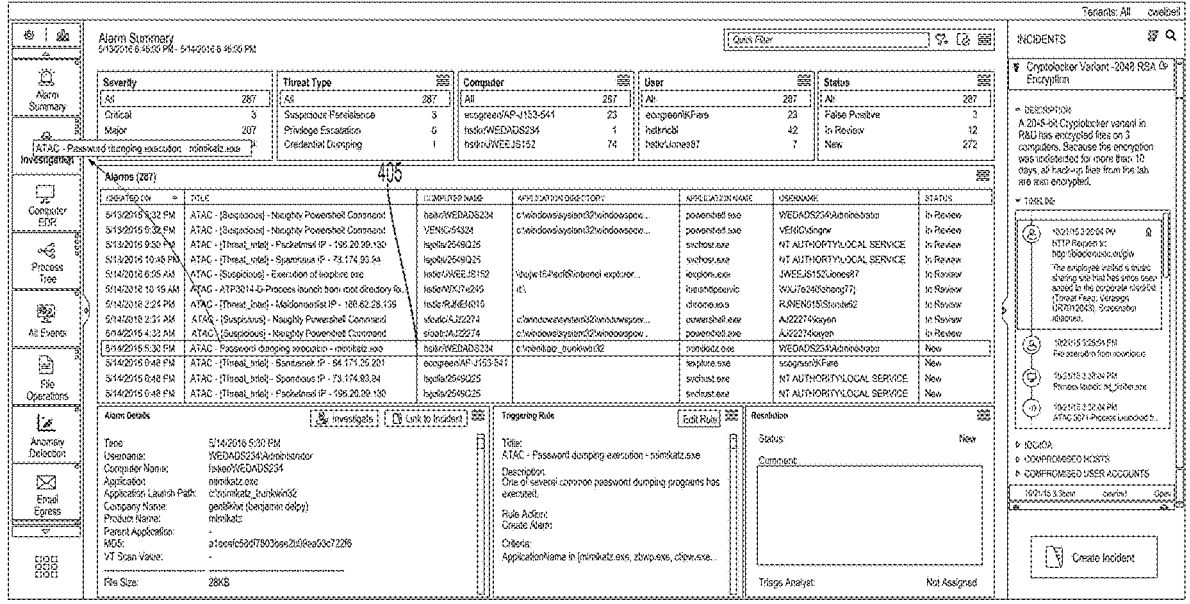
FIG. 4 is a screenshot depicting an example investigative graphical workspace with a list of entities in a networked environment.

Referring now to FIG. 4, depicted is a screenshot of an example investigative graphical workspace 400 with a list of entities (e.g., the entities 280) in a networked environment. The graphical workspace 400 may be an example of the user interface 230 generated and displayed via the tracker engine 205. The workspace 400 may include a list of operations 260 that triggered alarms in accordance with the security policy defined by the network administrator of the system 200. The user may use the list displayed on the workspace 400 to access detailed information on individual operations 260, for example, by clicking on line element 405.

Figure 5:
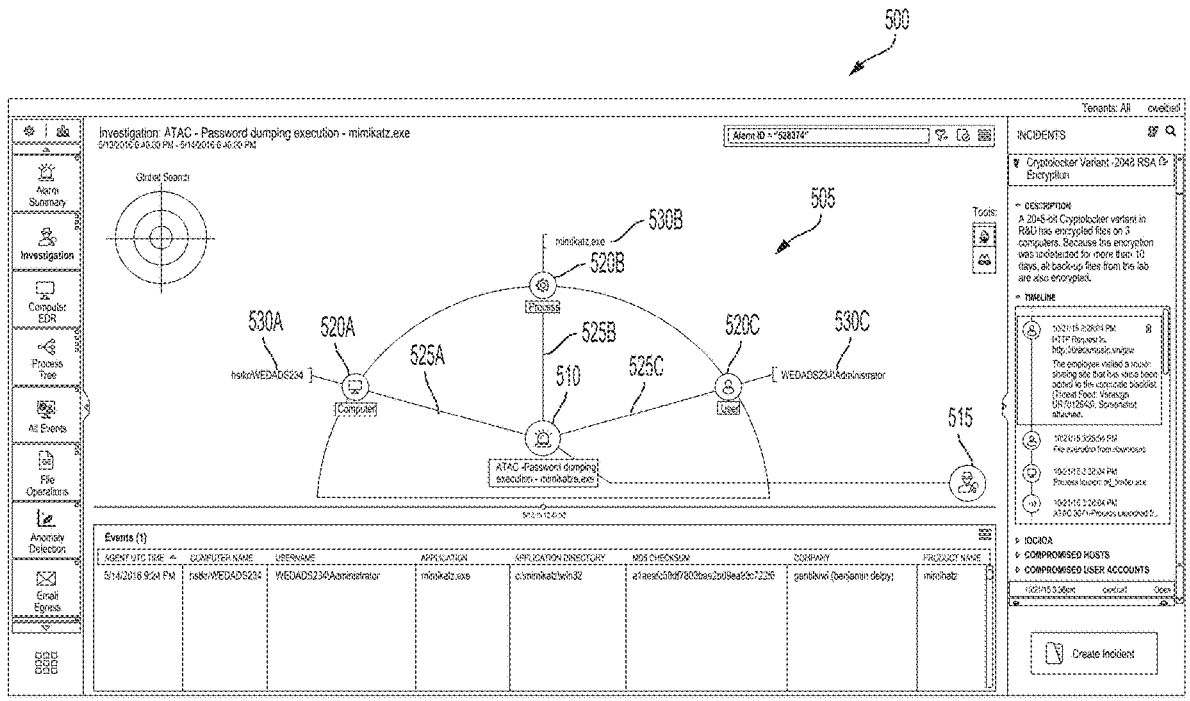
FIG. 5 is a screenshot depicting an example investigative graphical workspace with representations of entities in a networked environment with an initial anchor.

Referring now to FIG. 5, depicted is a screenshot of an example investigative graphical workspace 500 with representations of entities (e.g., the entities 280) in a networked environment with an initial anchor. The graphical workspace 500 may be an example of the user interface 230 generated and displayed via the tracker engine 205. In the example depicted, the graphical workspace 500 may have an investigation graph 505 generally in the middle of the display area. The investigation graph 505 may have a node 510 (e.g., in the form of an icon) representing the anchoring entity, such as an alert triggered from an operation 275. The default anchoring entity may be indicated in node 515, referred to as the investigation root node 515. The investigation graph 505 may have one or more branching nodes 520A-C surrounding the node 510. Each of the branching nodes 520A-C may correspond to entities 280 associated with the anchoring entity 280. The first node 520A may represent a client device 210, the second node 520B may represent a process 260, and the third node 520C may represent a particular user 255.

Between each node 520A-C and the node 510, the investigation graph 505 may have a corresponding link 525A-C. Link 525A may represent the association between the client device 210 represented by the node 520A and the alert represented by the node 510, link 525B may represent the association between the process 255 represented by the node 520B and the alert represented by the node 510, and link 525C may represent the association between the user 255 represented by the node 520C and the alert represented by the node 510. Near each of the branching nodes 520A-C, the investigation graph 505 may have element 530A-C providing additional information about the entity 280 represented by the nearby node 520A-C. Element 530A may include a computer name for the client 210 represented by the node 520A, element 530B may include an application name of the process 255 represented by the node 520B, and element 530C may include an account identifier for the user 255 represented by the node 520C.

Figure 6:
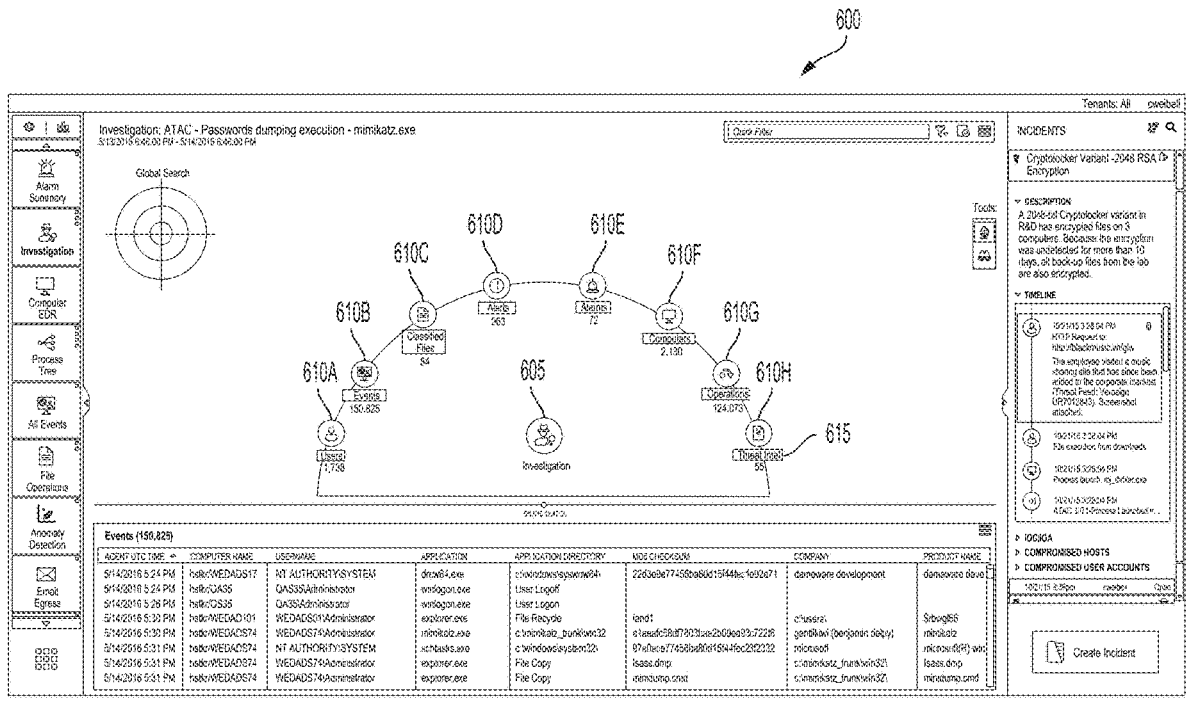
FIG. 6 is a screenshot depicting an example investigative graphical workspace with representations of entities in a networked environment without an initial anchor.

Referring now to FIG. 6, depicted is a screenshot of an example investigative graphical workspace 600 with representations of entities (e.g., the entities 280) in a networked environment without an initial anchor. The graphical workspace 600 may be an example of the user interface 230 generated and displayed via the tracker engine 205. In the example depicted, the graphical workspace 600 may have an investigation graph generally in the middle of the display area. The investigation graph may have one or more branching nodes 610A-H separated from the element 605. Each of the branching nodes 610A-H may correspond to various entities in the system 600. The first node 610A may represent users 255, the second node 610B may represent sets of operations 275 (also referred to as events), the third node 610C may represent files 270 with classified content, the fourth node 610D may represent alerts triggered from operations 275, the fifth node 610E may represent alarms triggered from operations 275, the sixth node 610F may represent clients 210 (or computers), the seventh node 610G may represent operations 275, the eighth node 610H may represent potential threat events. Below each node 610A-H, the investigation graph 605 may have element 615 displaying a label for the entity type of the represented entity 280 as well as statistics (e.g., number of associated entities 280) for the represented entity 280.

Figure 7A:
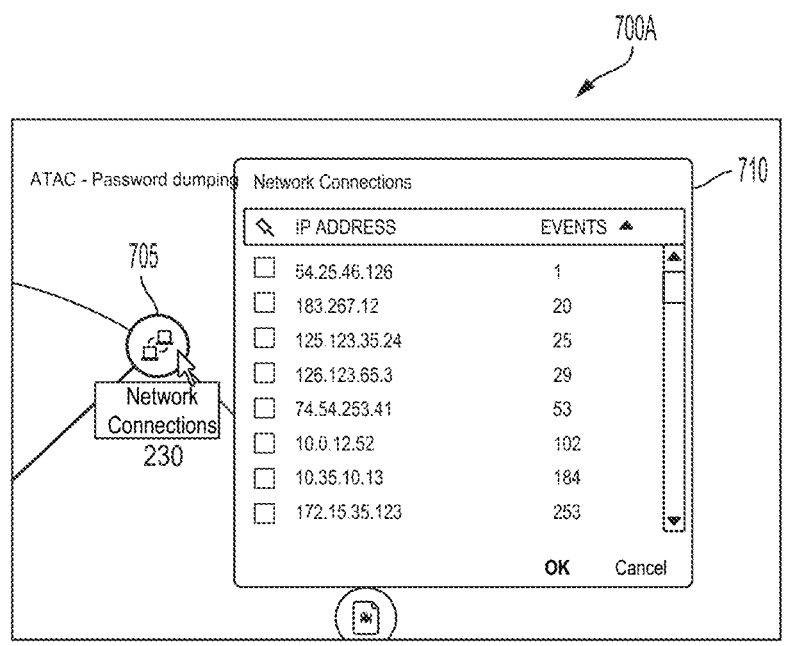
FIGS. 7A-7D are screenshots depicting an example investigative graphical workspace focusing in on additional informational available by interacting with one of the elements.
Figure 7B:
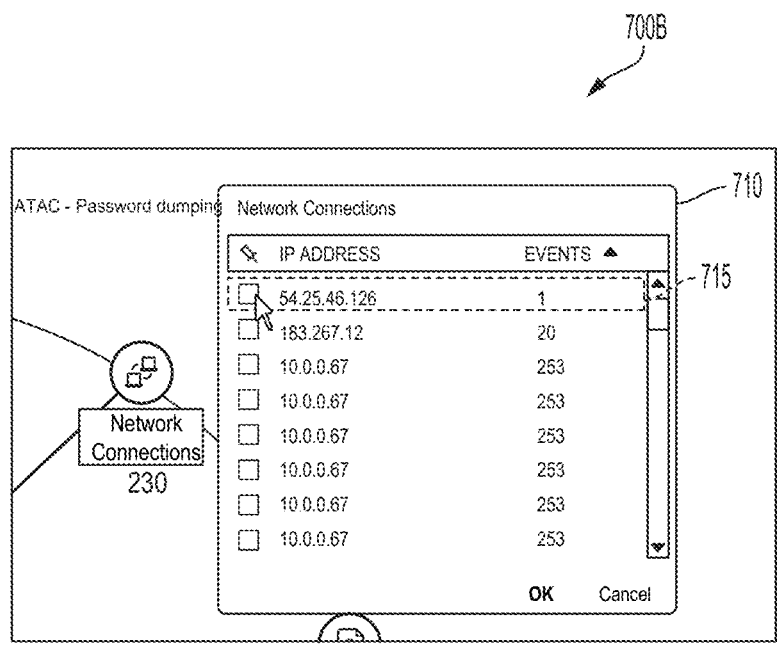
Figure 7C:
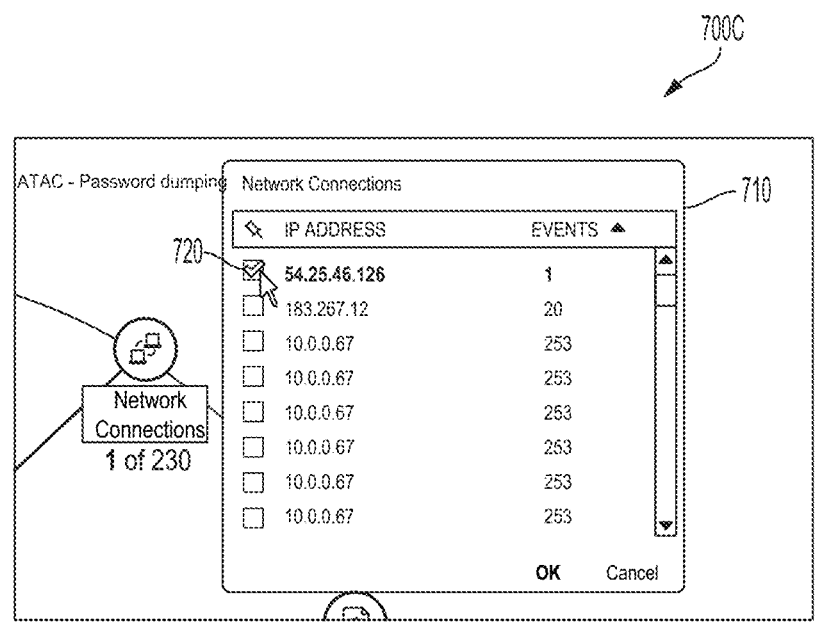
Figure 7D:
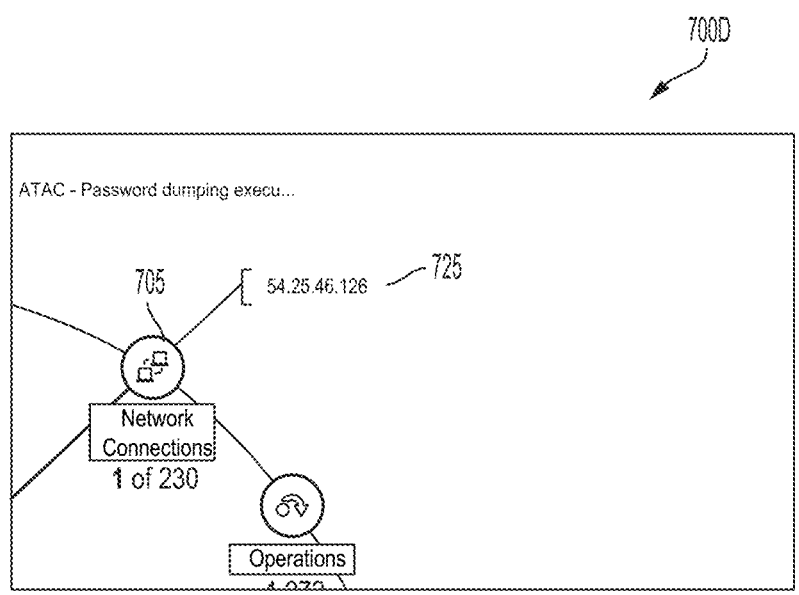

Referring now to FIGS. 7A-7D, depicted are screenshots of an example investigative graphical workspace at various stages 700A-D focusing in on additional informational available by interacting with one of the nodes. The stages 700A-D may be part of an example of the user interface 230 generated and displayed via the tracker engine 205 while performing the pin function available through the tracker engine 205. Referring to FIG. 7A, the graphical workspace in stage 700A may include a branching node 705 representing connections 265. Upon interaction with the node 705, the graphical workspace may display a prompt 710 listing and detailing the set of connections 265 established in the system 200. Referring to FIG. 7B, the graphical workspace in stage 700B may allow for selection of one of the connections 265 listed in the prompt 710 by interaction with an element 715. Referring to FIG. 7C, the graphical workspace in stage 700C may allow for the selection of one of the connections 265 listed in the prompt 710 by selection of a checkbox element 720. Referring to FIG. 7D, once the connection 265 is selected, the graphical workspace in stage 700D may display information (e.g., an IP address) related to the selected connection 265 next to the node 705 using element 725.

Figure 8A:
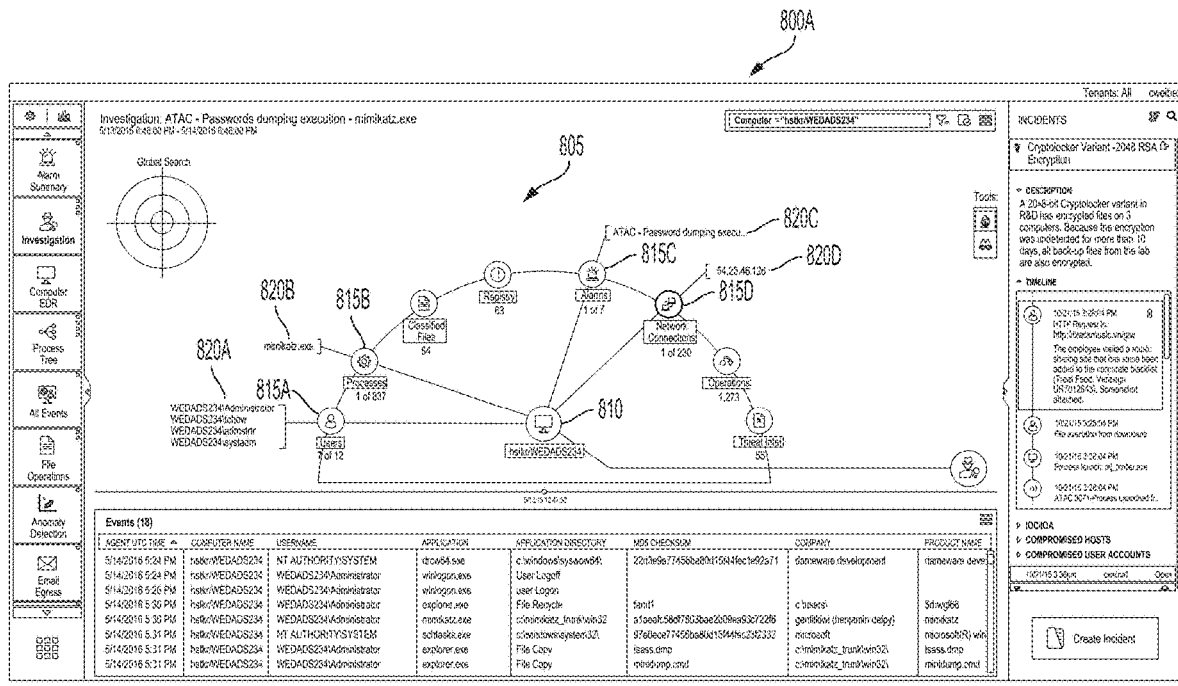
FIGS. 8A-8F are screenshots depicting an example investigative graphical workspace and a drill down feature accessible via the workspace.
Figure 8B:
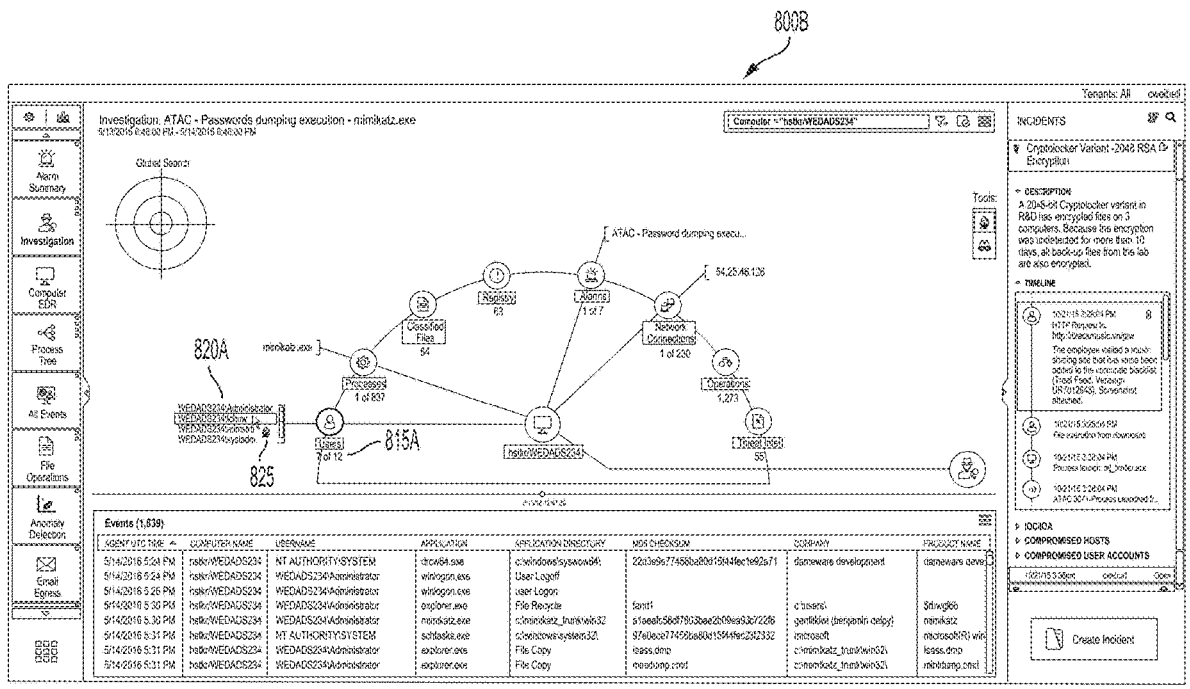

Referring now to FIGS. 8A-8F, depicted are screenshots of example investigative graphical workspaces at various stages 800A-F and a drill down feature accessible via the workspace. The stages 800A-F of the graphical workspace may be an example of the user interface 230 generated and displayed via the tracker engine 205 while performing the drill down feature. Referring to FIG. 8A, the graphical workspace in stage 800A may display an interactive graph 805 generally in the middle of the display. The interactive graph 805 may include a node 810 representing the anchor entity 280. Surrounding the node 810, the interactive graph 805 may include one or more branching nodes 815A-D, each representing entity types of the entities 280 associated with the anchor entity 280. Next to some of the branching nodes 815A-D, the interactive graph 805 may include a corresponding element 820A-D listing entities 280 identified under the entity type represented by the respective branching node 815A-D. Referring to FIG. 8B, in the graphical workspace in stage 800B, to access the drill down feature, one element 820A may be interacted with to expand to display a list of entities 280 classified under the entity type (e.g., users 255 as depicted). An item 825 in the list of entities 280 may be selected for further investigation through the graphical workspace. The item 825 may correspond to a particular user 255.

Figure 8C:
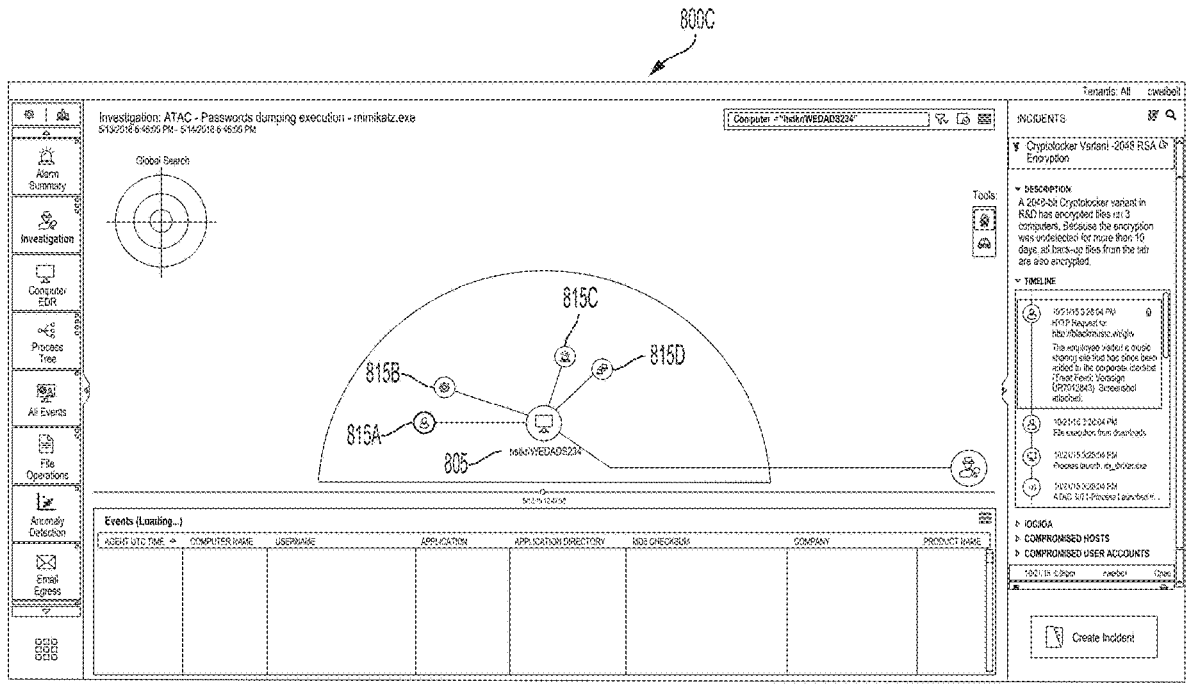
Figure 8D:
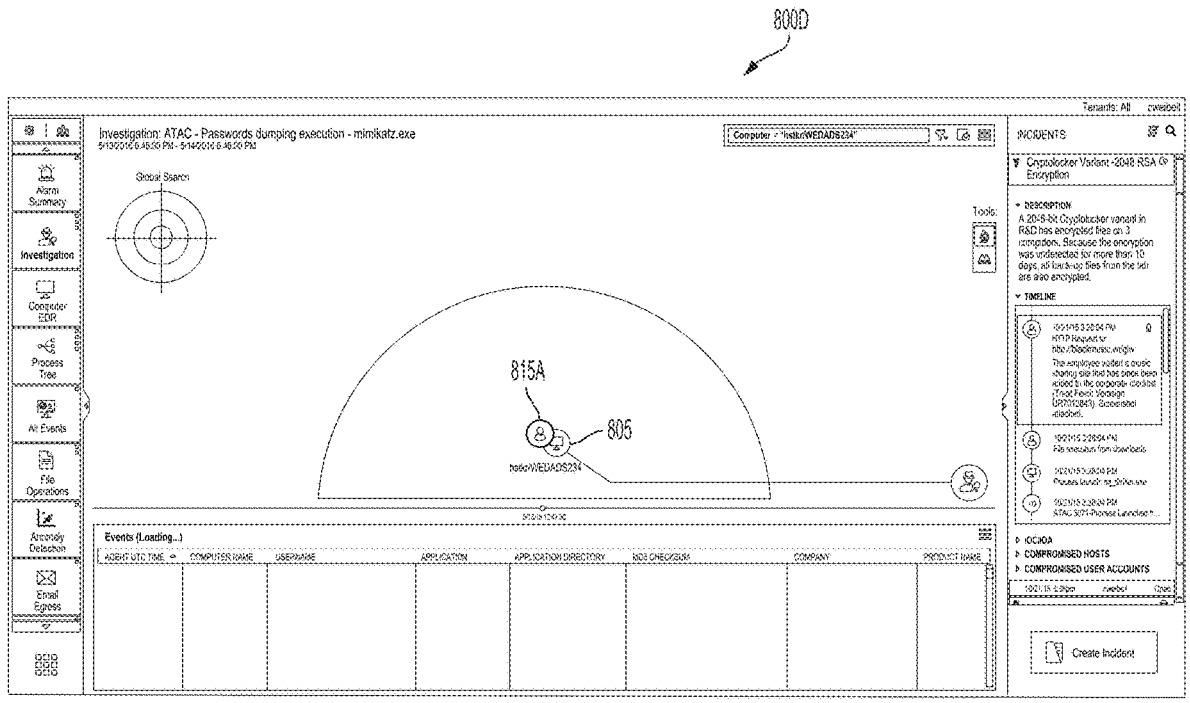
Figure 8E:
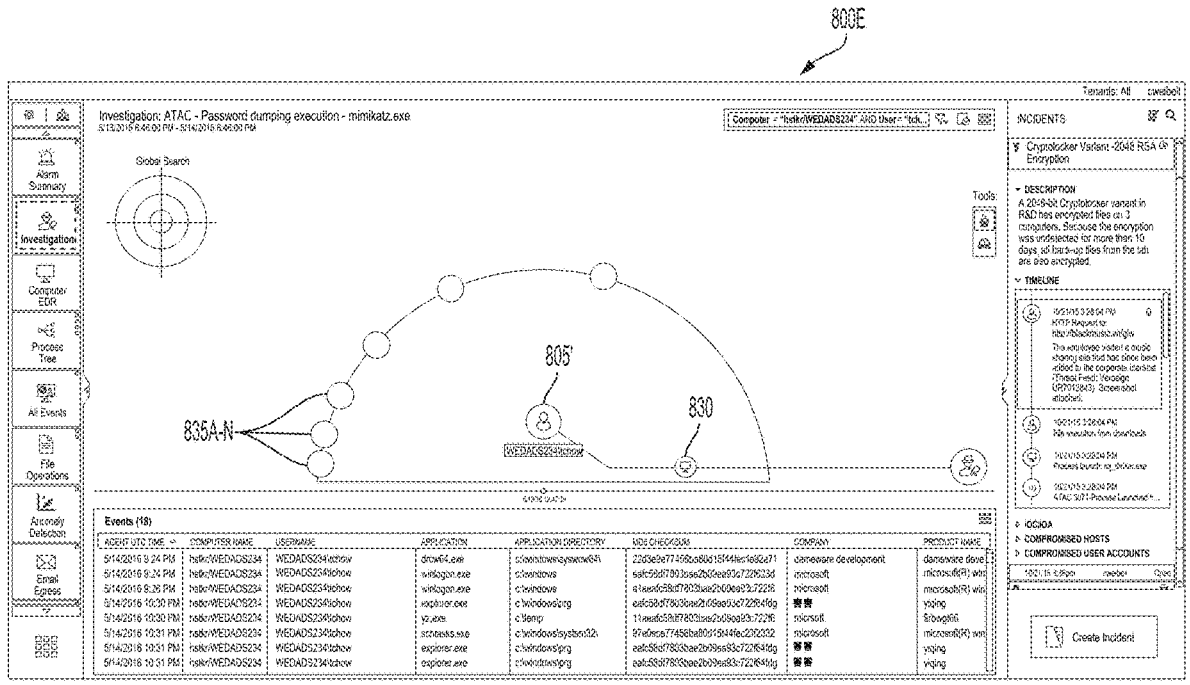

Referring to FIG. 8C, the graphical workspace in stage 800C may show an animation to transition to focus on the user 255 entity 280 selected via the item 825 in the list of entities 280 from the previous stage by collapsing the nodes 815A-D. Referring to FIG. 8D, the graphical workspace in stage 800D may continue the animation to transition to focus on the user 255 entity 280 selected via the item 825 in the list of entities 280 by limiting the showing of the nodes to 815A corresponding to the user 255. Referring to FIG. 8E, the graphical workspace in stage 800E may continue the animation to transition the graphical workspace to focus on the user 255 entity 280 selected via the item 825 in the list of entities 280 by showing new branching nodes 835A-N.

Figure 8F:
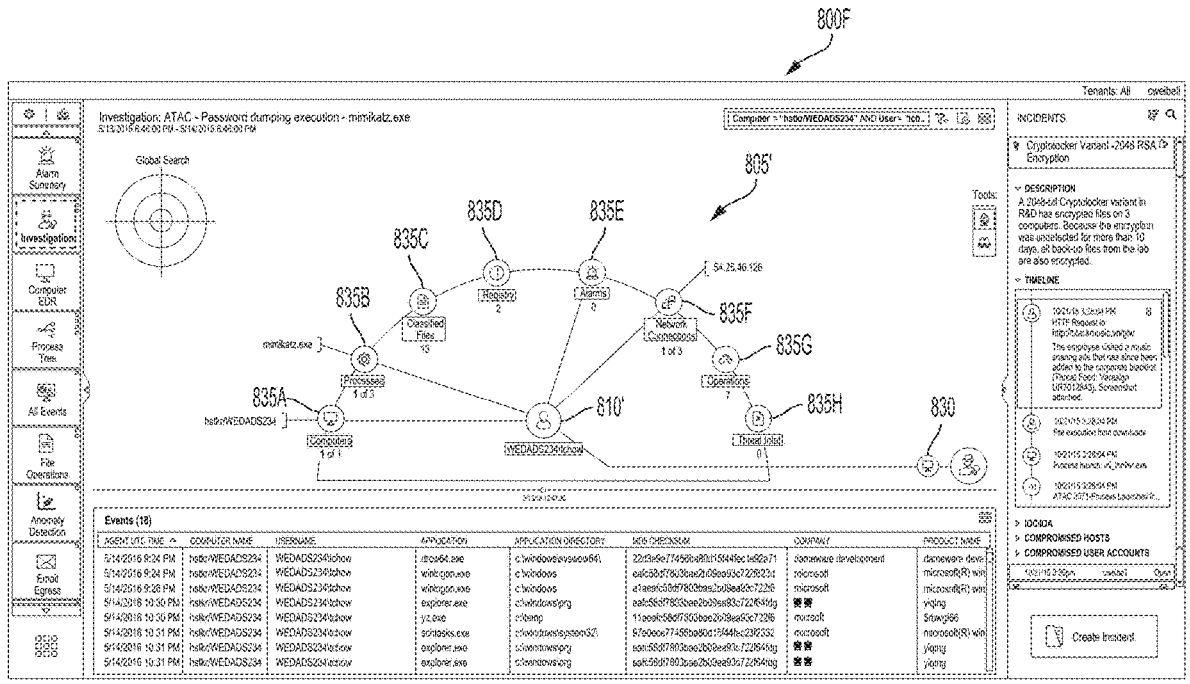

Referring to FIG. 8F, the graphical workspace in stage 800F may have completed the transition animation, and may display a new interactive graph 805' generally in the middle of the display area. The interactive graph 805' may include a node 810' representing the anchor entity 280 corresponding the user 255 that was selected via item 825. Surrounding the node 810', the interactive graph 805' may include one or more branching nodes 835A-H, each representing entity types of the entities 280 associated with the anchor entity 280 and related information.

Figure 9A:
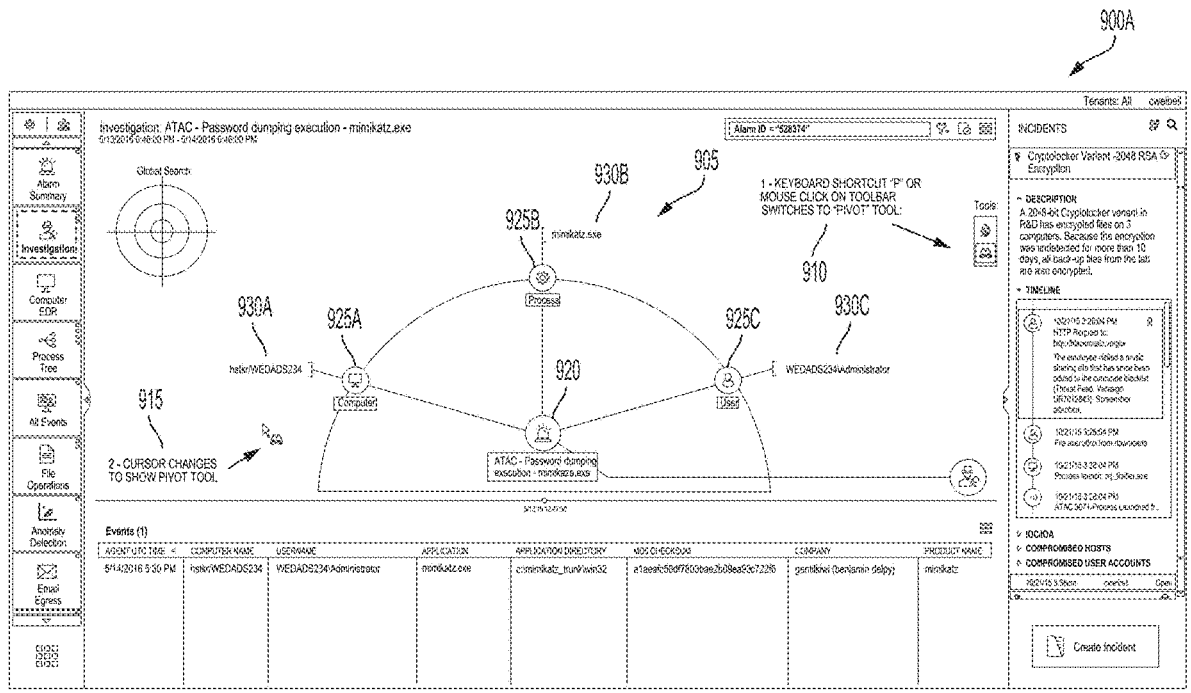
FIGS. 9A-9E are screenshots depicting an example investigative graphical workspace and a pivot feature accessible via the workspace.

Referring now to FIGS. 9A-9E, depicted are screenshots of an example investigative graphical workspace at various stages 900A-E and a pivot feature accessible via the workspace. The stages 900A-E of the graphical workspace may be an example of the user interface 230 generated and displayed via the tracker engine 205 while performing the pivot function. Referring to FIG. 9A, the graphical workspace in stage 900A may include an interactive graph 905 generally in the middle of the display area. To trigger the pivot function, a toolbar 910 in the workspace may be interacted with, leading to a change in the cursor 915. The interactive graph 905 may include a node 920 representing the anchor entity 280 corresponding to an alert trigger by an operation detected in the system 200. Surrounding the node 920, the interactive graph 905 may include one or more branching nodes 925A-C, each representing entity types of the entities 280 associated with the anchor entity 280. Next to some of the branching nodes 925A-C, the interactive graph 905 may include a corresponding element 930A-C listing entities 280 identified under the entity type represented by the respective branching node 925A-C.

Figure 9B:
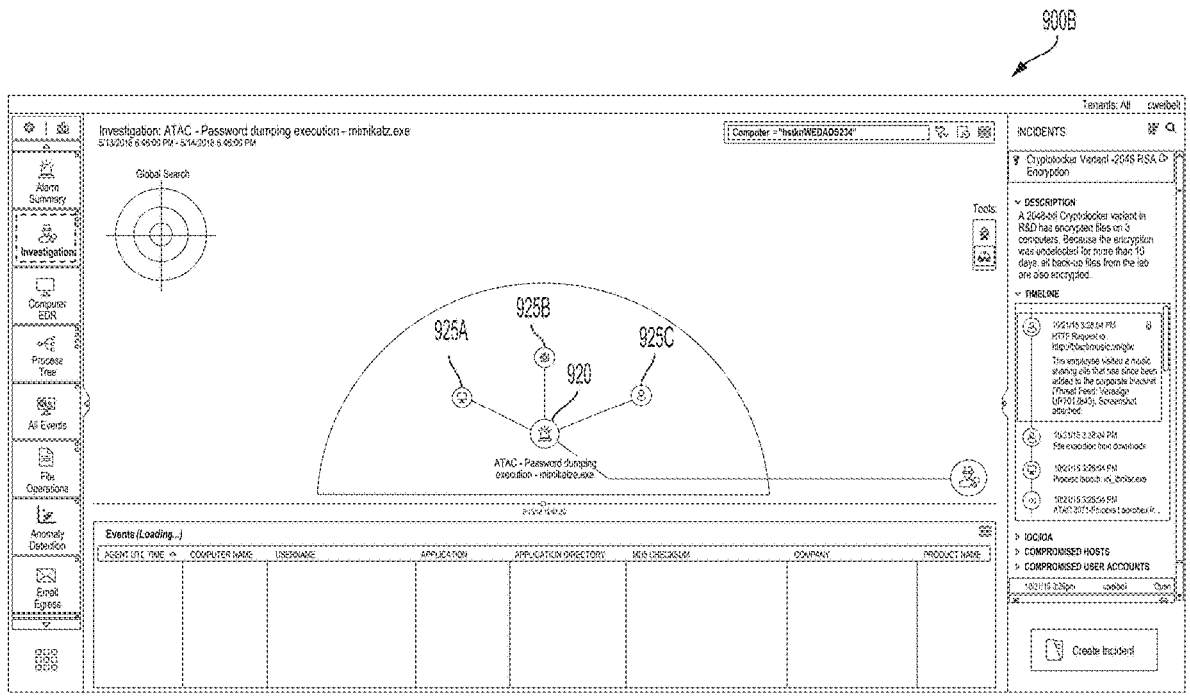
Figure 9C:
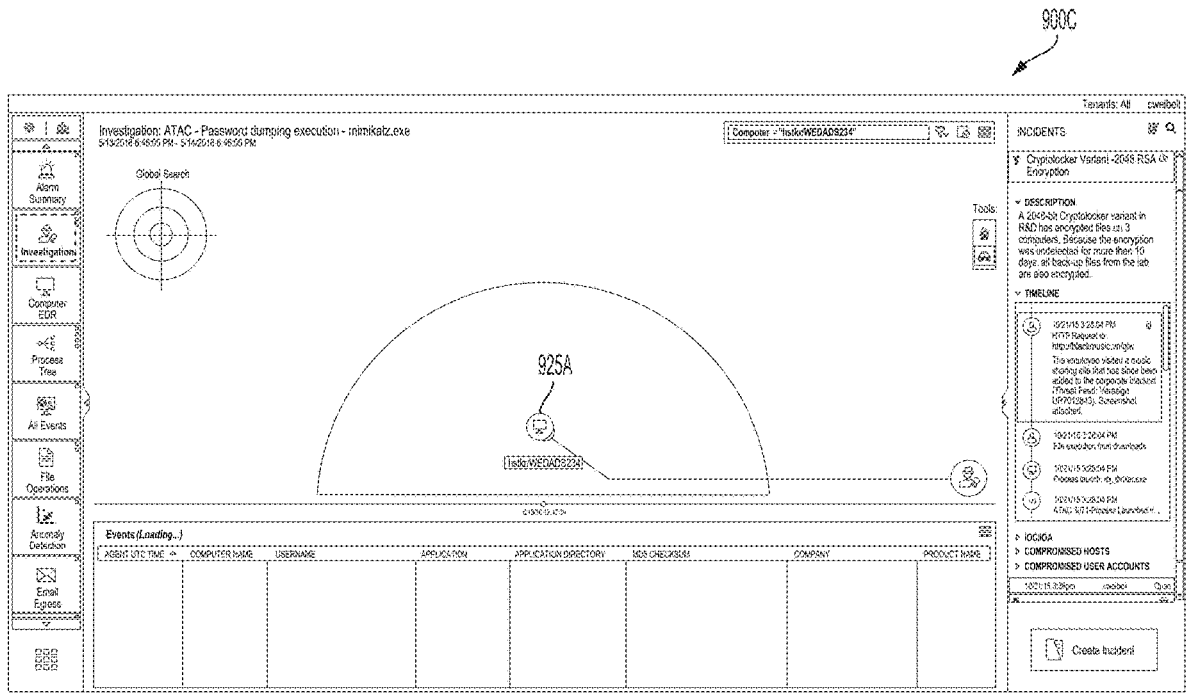
Figure 9D:
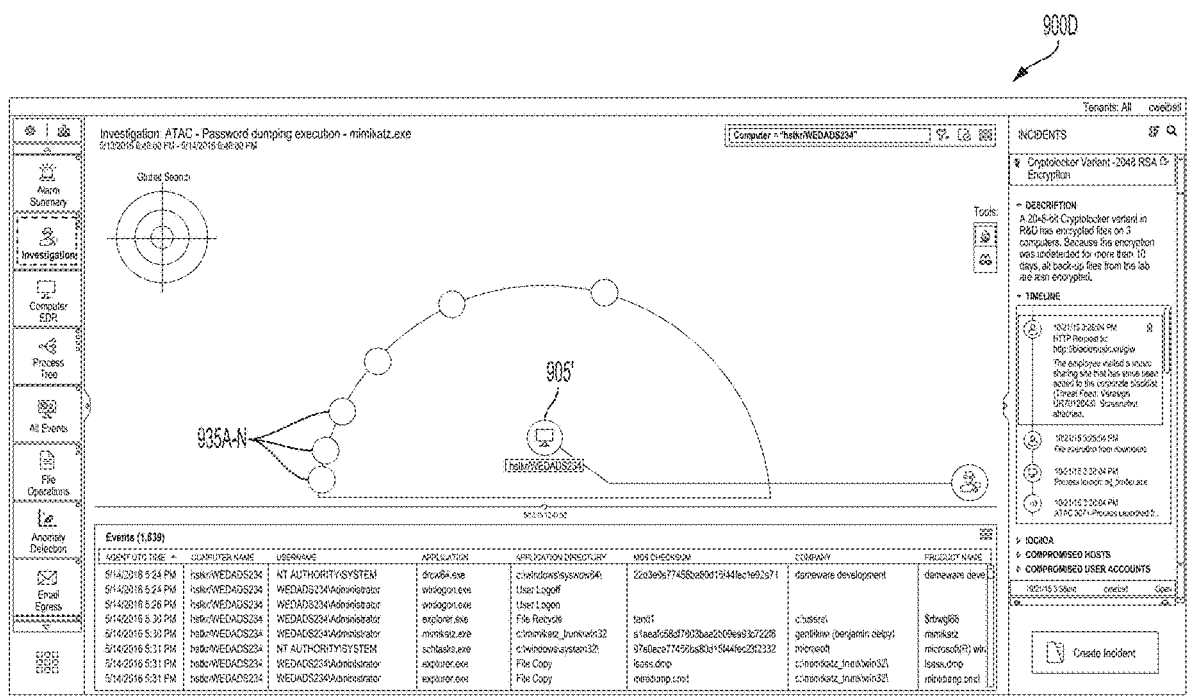

Referring to FIG. 9B, the graphical workspace in stage 900B may show an animation to transition to focus on the client 210 entity 280 selected via one of the branching nodes 925A-C from the previous stage by collapsing all the nodes 825A-D. In triggering the pivot function, the branching node 925A corresponding to clients 210 may have been selected. Referring to FIG. 9C, the graphical workspace in stage 900B may show an animation to transition to focus on the client 210 entity 280 selected via one of the branching nodes 925A-C by replacing the original anchor node 905 with the branch node 925A that was selected. Referring to FIG. 9D, the graphical workspace in stage 900D may continue the animation to transition the graphical workspace to focus on the clients 210 selected via one of the branching nodes 925A-C by showing new branch nodes 935A-N.

Figure 9E:
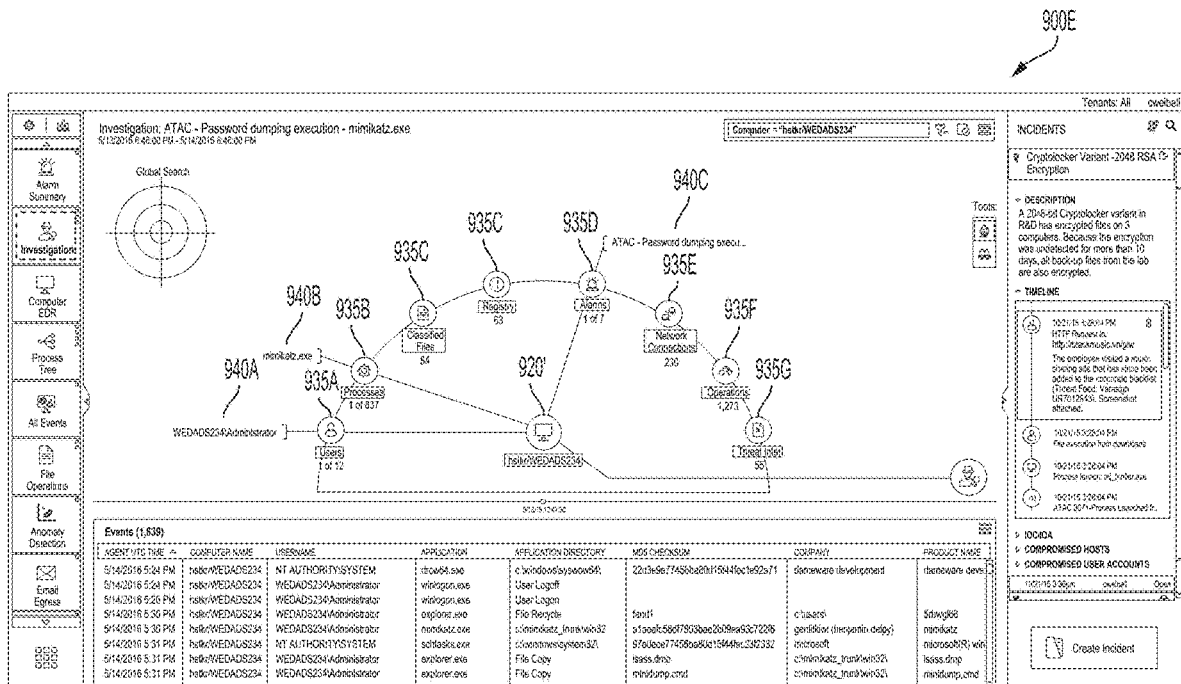

Referring to FIG. 9E, the graphical workspace in stage 900E may have completed the transition animation, and may display a new interactive graph 905' generally in the middle of the display area. The interactive graph 905' may include a node 910' representing the anchor entity 280 corresponding the user 255 that was selected via item 925. Surrounding the node 910', the interactive graph 905' may include one or more branching nodes 935A-G, each representing entity types of the entities 280 associated with the new anchor entity 280 and related information via elements 940A-C.

Figure 10:
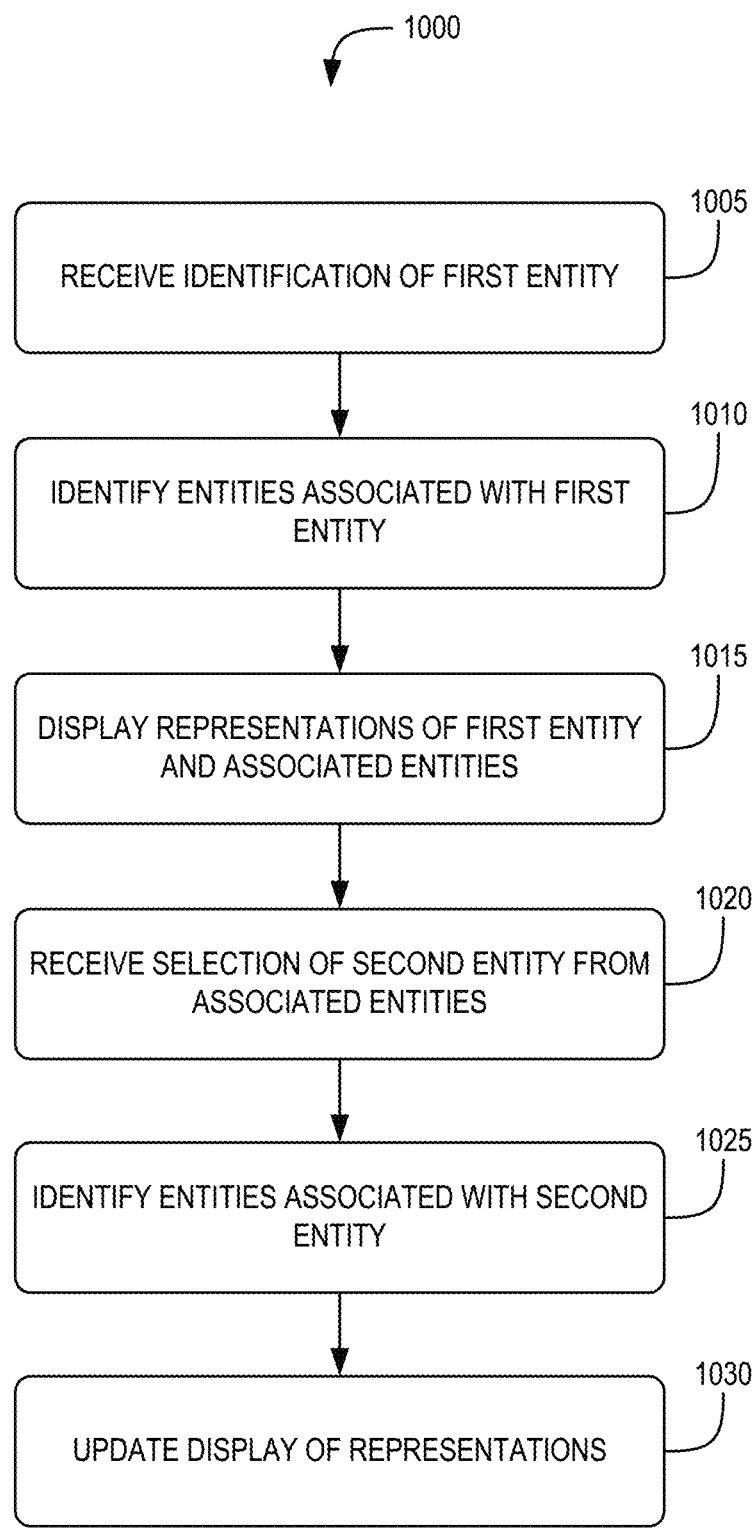
FIG. 10 is a flow diagram depicting an example embodiment of a method of investigating entities or potential incidents across entities in networked environments.

Referring now to FIG. 10, depicted is a flow diagram of a method 1000 of investigating entities or potential incidents across entities in networked environments. The method 1000 may be performed or be executed by any one or more components of the system 100 described above in conjunction with FIGS. 1A-1D, the system 200 detailed above in conjunction with FIG. 2, or any of the embodiments discussed herein in conjunction with FIGS. 3-9E. In brief overview, a tracker engine may receive an identification of a first entity (1005). The tracker engine may identify entities associated with the first entity (1010). The tracker engine may display a representation of the first entity and the associated entities (1015). The tracker engine may receive a selection of a second entity from the associated entities (1020). The tracker engine may identify entities associated with the second entity (1025). The tracker engine may update the display of representations (1030).

In further detail, a tracker engine (e.g., the tracker engine 205) may receive an identification of a first entity (e.g., entity 280) (1005). The first entity may serve as an initial point for investigating the entities in a network environment (e.g., the system 200). The tracker engine may receive the identification of the first entity via a user interface (e.g., the user interface 230). The user interface may include a graphical representation (e.g., the node 285) of entities including the first entity. By receiving an interaction with the graphical representation via the user interface, the tracker engine may identify the first entity corresponding to the graphical representation.

The tracker engine may identify entities associated with the first entity (1010). Types of entities to be identified may include devices (e.g., the client 210, the data storage 215, and the server 220), users (e.g., the user 255), applications (e.g., the process 260), files (e.g., the file 270), network connections (e.g., the connection 265), and operations (e.g., the operation 275). By accessing and monitoring various devices, the tracker engine may find associated entities. The tracker engine may identify the associated entities with the first entity through another entity. For example, the tracker engine may identify two devices that are associated based on a connection established between the devices across the network.

The tracker engine may display a representation (e.g., the user interface 230) of the first entity (e.g., using the node 285A) and the associated entities (e.g., using the node 285B) (1015). Based on the identification, the tracker engine may generate a graphical representation of the entities (e.g., using nodes 285A and 285B) and also the identified association between the entities (e.g., using the link 290). The tracker engine may also retrieve for display information related to the associated entities, such as metadata, the list of individual entities, and the number of entities, among others.

The tracker engine may receive a selection of a second entity from the associated entities (1020). Subsequent to displaying the representation, the tracker engine may detect an interaction with the graphical representation corresponding to one of the associated entities (e.g., using the node 285). In response, the tracker engine may identify the entity corresponding to the interacted graphical representation. Additionally, the tracker engine may identify a function to be performed with respect to the selection, such as a pin function, a tag function, a filter function, or a pivot function, among others.

The tracker engine may identify entities associated with the second entity (1025). The tracker engine may repeat the functionality of (1010) in identify the entities associated with the selected, second entity. The tracker engine may identify the associated entities with the first entity through another entity. The tracker engine may also retrieve for display information related to the associated entities. The tracker engine may update the display of representations (e.g., in the user interface 230) (1030). The tracker engine may generate the graphical representation of the second entity and associated entities (e.g., using nodes 285A and 285B) and the identified association between the entities (e.g., using the link 290). The generation of the graphical representation may be in accordance with the function to be performed.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A system comprising:
    a display device configured to output, for display, a user interface; and
    a tracker engine executable on at least one processor, the tracker engine configured to:
        receive an identification of a first entity as an anchor entity in a networked environment;
        display, in the user interface displayed on the display device and responsive to receiving the identification of the first entity as the anchor entity, (i) a representation of the first entity pinned to a fixed position on the user interface, and (ii) representations of a plurality of entities each of a corresponding type from a plurality of types and having a corresponding bidirectional or unidirectional relationship with the first entity in the networked environment, the plurality of types comprising at least one of a network connection, a file, a process, a user, an event, a client, a server, a database, a registry, a hash, or a computing device;
        receive, via the user interface, a selection indicating a request to display one or more alarms in the networked environment, wherein the one or more alarms comprise one or more entities of the plurality of entities that have the corresponding bidirectional or unidirectional relationship with the first entity and that violate a security policy of the networked environment;
        display, in the user interface displayed on the display device and responsive to receiving the selection indicating the request to display the one or more alarms in the networked environment, (i) the representation of the first entity pinned to the fixed position on the user interface, (ii) only the representations of one or more entities from the plurality of entities that correspond to the one or more alarms, and (iii) a description of the security policy violated by each entity of the one or more entities from the plurality of entities that correspond to the one or more alarms;
        receive, via the user interface, a selection of a second entity from the one or more entities of the plurality of entities that correspond to the one or more alarms and associated with the first entity to change the anchor entity from the first entity to the second entity; and
        update, responsive to receiving the selection of the second entity as the anchor entity, the user interface displayed on the display device to include (a) a representation of the second entity pinned to a position at the fixed position of the representation of the first entity prior to the selection of the second entity on the user interface and graphically linked to the representation of the first entity, (b) the representation of the first entity removed from the fixed position, and (c) representations of a plurality of entities associated with the second entity in the networked environment, with each of the plurality of entities associated with the second entity having a same type as the second entity.

2. The system of claim 1, wherein the tracker engine is further configured to receive user input via the user interface to pin at least one of the representation of the first entity or the representation of the second entity, within a display portion of the user interface.

3. The system of claim 1, wherein the tracker engine is further configured to tag the at least one of the representation of the first entity or the representation of the second entity that is pinned, with a description.

4. The system of claim 1, wherein the plurality of entities associated with the first entity are grouped by entity types, and the representations of the plurality of entities associated with the first entity include a representation of each of the entity types.

5. The system of claim 1, wherein the tracker engine is further configured to display information about the plurality of entities associated with the first entity in a display portion of the user interface, when displaying the representations of the plurality of entities associated with the first entity.

6. The system of claim 5, wherein the tracker engine is further configured to update the display portion to display information about the plurality of entities associated with the second entity, when displaying the representations of the plurality of entities associated with the second entity.

7. The system of claim 1, wherein the tracker engine is further configured to:
    receive, via the user interface, an instruction to pivot from the second entity to a third entity from the plurality of entities associated with the second entity; and
    update, responsive to receiving the instruction, the user interface to display a representation of the third entity, and representations of a plurality of entities associated with the third entity in the networked environment.

8. The system of claim 1, wherein the tracker engine is further configured to identify the plurality of entities associated with the first entity, and the plurality of entities associated with the second entity, for a defined window of time.

9. The system of claim 1, wherein the tracker engine is further configured to display, in a graph or tree format, the representation of the second entity graphically linked to the representation of the first entity.

10. A method, comprising:
    receiving, by a tracker engine executable on at least one processor, an identification of a first entity as an anchor entity in a networked environment;
    outputting, by the tracker engine and for display on a display device, a user interface responsive to receiving the identification of the first entity as the anchor entity, the user interface including (i) a representation of the first entity pinned to a fixed position on the user interface, and (ii) representations of a plurality of entities each of a corresponding type from a plurality of types and having a corresponding bidirectional or unidirectional relationship with the first entity in the networked environment, the plurality of types comprising at least one of a network connection, a file, a process, a user, an event, a client, a server, a database, a registry, a hash, or a computing device;

receiving, by the tracker engine and via the user interface, a selection indicating a request to display one or more alarms in the networked environment, wherein the one or more alarms comprise one or more entities of the plurality of entities that have the corresponding bidirectional or unidirectional relationship with the first entity and that violate a security policy of the networked environment;

updating, by the tracker engine, the user interface displayed on the display device responsive to receiving the selection indicating the request to display the one or more alarms in the networked environment, (i) the representation of the first entity pinned to the fixed position on the user interface, (ii) only the representations of one or more entities from the plurality of entities that correspond to the one or more alarms, and (iii) a description of the security policy violated by each entity of the one or more entities from the plurality of entities that correspond to the one or more alarms;

receiving, by the tracker engine via the user interface, a selection of a second entity from the one or more entities of the plurality of entities that correspond to the one or more alarms and associated with the first entity to change the anchor entity from the first entity to the second entity; and updating, by the tracker engine responsive to receiving the selection of the second entity as the anchor entity, the user interface displayed on the display device to display (a) a representation of the second entity pinned to a position at the fixed position of the representation of the first entity prior to the selection of the second entity on the user interface and graphically linked to the representation of the first entity, (b) the representation of the first entity removed from the fixed position, and (c) representations of a plurality of entities associated with the second entity in the networked environment, with at least one of the plurality of entities associated with the second entity having a same type as the second entity, and with the representations of the plurality of entities associated with the second entity displayed including those of all the entities associated with the second entity that have a same type as the second entity.

11. The method of claim 10, further comprising receiving, by the tracker engine, user input via the user interface to pin at least one of the representation of the first entity or the representation of the second entity, within a display portion of the user interface.

12. The method of claim 10, further comprising tagging, by the tracker engine, the at least one of the representation of the first entity or the representation of the second entity that is pinned, with a description.

13. The method of claim 10, wherein the plurality of entities associated with the first entity are grouped by entity types, and the representations of the plurality of entities associated with the first entity include a representation of each of the entity types.

14. The method of claim 10, further comprising displaying, by the tracker engine, information about the plurality of entities associated with the first entity in a display portion of the user interface, when displaying the representations of the plurality of entities associated with the first entity.

15. The method of claim 14, further comprising updating, by the tracker engine, the display portion to display information about the plurality of entities associated with the second entity, when displaying the representations of the plurality of entities associated with the second entity.

16. The method of claim 10, further comprising:
receiving, by the tracker engine via the user interface, an instruction to pivot from the second entity to a third entity from the plurality of entities associated with the second entity; and
updating, by the tracker engine responsive to receiving the instruction, the user interface to display a representation of the third entity, and representations of a plurality of entities associated with the third entity in the networked environment.

17. The method of claim 10, further comprising identifying, by the tracker engine, the plurality of entities associated with the first entity, and the plurality of entities associated with the second entity, for a defined window of time.

18. The method of claim 10, further comprising displaying, by the tracker engine in a graph or tree format, the representation of the second entity graphically linked to the representation of the first entity.

* * * * *